(12) United States Patent
Klivington et al.

(10) Patent No.: US 8,566,112 B2
(45) Date of Patent: *Oct. 22, 2013

(54) ELECTRONIC REALTY AND TRANSACTION SYSTEM AND METHOD THEREIN

(76) Inventors: Eva T. Klivington, Fairfax, VA (US); Margit E. Klivington, Alexandria, VA (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/901,503

(22) Filed: Oct. 9, 2010

(65) Prior Publication Data

US 2011/0251967 A1    Oct. 13, 2011

Related U.S. Application Data

(63) Continuation of application No. 10/329,921, filed on Dec. 27, 2002, now Pat. No. 7,818,219.

(60) Provisional application No. 60/342,396, filed on Dec. 27, 2001.

(51) Int. Cl.
    *G06Q 10/00*    (2012.01)

(52) U.S. Cl.
    USPC ............. 705/1.1; 705/313; 707/945; 707/946

(58) Field of Classification Search
    USPC ............................ 705/1.1, 313; 707/945, 946
    See application file for complete search history.

(56) References Cited

U.S. PATENT DOCUMENTS

| | | | |
|---|---|---|---|
| 4,800,485 A | 1/1989 | Ackroff et al. | |
| 5,043,891 A | 8/1991 | Goldstein et al. | |
| 5,140,650 A | 8/1992 | Casey et al. | |
| 5,267,155 A | 11/1993 | Buchanan et al. | |
| 5,446,653 A | 8/1995 | Miller et al. | |
| 5,692,206 A * | 11/1997 | Shirley et al. | 715/256 |
| 5,754,850 A * | 5/1998 | Janssen | 707/758 |
| 6,055,413 A * | 4/2000 | Morse et al. | 340/7.43 |
| 6,067,531 A | 5/2000 | Hoyt et al. | |
| 6,182,095 B1 | 1/2001 | Leymaster et al. | |
| 6,236,984 B1 | 5/2001 | Owens et al. | |
| 6,314,404 B1 | 11/2001 | Good et al. | |
| 6,338,050 B1 | 1/2002 | Conklin et al. | |
| 6,363,360 B1 | 3/2002 | Madden | |
| 6,502,113 B1 | 12/2002 | Crawford et al. | |
| 6,519,618 B1 | 2/2003 | Snyder | |
| 6,594,633 B1 * | 7/2003 | Broerman | 705/313 |
| 6,751,596 B1 * | 6/2004 | Hastings | 705/7.31 |
| 6,775,678 B1 * | 8/2004 | Hillberg et al. | 1/1 |

(Continued)

OTHER PUBLICATIONS

Pacific Bell Realtylink: California Realtors Develop Revolutionary Real Estate Services Edge, on & about AT&T, v 7, n 196, p. N/A Apr. 27, 1992.*

(Continued)

*Primary Examiner* — Shannon Campbell

(57) ABSTRACT

The electronic realty transaction system (ERTS) automates real estate processes and provides web-based accessibility to residential, commercial, and land markets. The system will provide a "one-stop-shop" for all real estate related transactions and will include a detailed tracking and history of customer transactions for the realtors. The system will provide the ability to charge, collect, and track payments for real estate related transactions. ERTS includes an electronic contract generator (ECG) that pulls information from multiple sources and automatically identifies end-user requests for services and ultimately enables a property request (i.e. contract) to be developed using auto populating techniques.

31 Claims, 23 Drawing Sheets

(56) References Cited

U.S. PATENT DOCUMENTS

| | | |
|---|---|---|
| 6,842,738 B1 | 1/2005 | Bradley et al. |
| 6,904,418 B2 | 6/2005 | Walker et al. |
| 7,340,435 B2 | 3/2008 | McDonald et al. |
| 2001/0025250 A1 | 9/2001 | Gale et al. |
| 2001/0039496 A1 | 11/2001 | Good et al. |
| 2001/0039524 A1 | 11/2001 | Harrison, Jr. et al. |
| 2001/0047282 A1 | 11/2001 | Raveis, Jr. |
| 2002/0023036 A1 | 2/2002 | Meder |
| 2002/0038280 A1 | 3/2002 | Levy |
| 2002/0040319 A1 | 4/2002 | Brauer |
| 2002/0052814 A1 | 5/2002 | Ketterer |
| 2002/0062277 A1 | 5/2002 | Foster et al. |
| 2002/0069079 A1 | 6/2002 | Vega |
| 2002/0069155 A1 | 6/2002 | Nafeh et al. |
| 2002/0087465 A1 | 7/2002 | Ganesan et al. |
| 2002/0091623 A1 | 7/2002 | Daniels |
| 2002/0095385 A1 | 7/2002 | McAvoy et al. |
| 2004/0143450 A1 | 7/2004 | Vidai |
| 2004/0148410 A1 | 7/2004 | Howard et al. |
| 2005/0055306 A1 | 3/2005 | Miller et al. |
| 2005/0096926 A1 | 5/2005 | Eaton et al. |
| 2005/0289046 A1 | 12/2005 | Conyack, Jr. |
| 2009/0150216 A1* | 6/2009 | Milman et al. ............ 705/10 |

OTHER PUBLICATIONS

Non-Final Office Action received for U.S. Appl. No. 10/329,921, mailed on Jul. 27, 2005, 10 pages.
Final Office Action received for U.S. Appl. No. 10/329,921, mailed on Dec. 2, 2005, 14 pages.
Non-Final Office Action received for U.S. Appl. No. 10/329,921, mailed on Jul. 3, 2007, 16 pages.
Non-Final Office Action received for U.S. Appl. No. 10/329,921, mailed on Feb. 6, 2008, 23 pages.
Non-Final Office Action received for U.S. Appl. No. 10/329,921, mailed on Feb. 18, 2009, 25 pages.
Final Office Action received for U.S. Appl. No. 10/329,921, mailed on Dec. 8, 2009, 22 pages.
Notice of Allowance received for U.S. Appl. No. 10/329,921, mailed on Aug. 19, 2010, 18 pages.
"Regional Sales Contract including Virginia Jurisdictional Addendum", Sales Contract Addendum for Lead-Based paint testing, and residential property Disclaimer Statement, 1999.

* cited by examiner

ELECTRONIC REALTY AND TRANSACTION SYSTEM AND METHOD THEREIN

CROSS REFERENCE TO RELATED APPLICATIONS

This is a continuation of U.S. patent application Ser. No. 10/329,921, filed on Dec. 27, 2002, titled ELECTRONIC REALTY AND TRANSACTION SYSTEM AND METHOD THEREIN, which claims priority from U.S. Provisional Patent Application No. 60/342,396, filed on Dec. 27, 2001, titled ELECTRONIC REALTY AND TRANSACTION SYSTEM (ERTS), both of which are incorporated herein by reference.

TECHNICAL FIELD

The present invention relates generally to real estate business processes, and specifically to a web-based electronic real estate and transaction system and methods therein that operate to streamline, bundle together and make available online many aspects, including relevant forms, involved in executing a real estate transaction.

BACKGROUND

Real estate listings are presently handled by a Multiple Listing Service (MLS) Regional information system. This MLS system is designed for the use of Real Estate Professionals who currently retrieve real estate information from this system to service their customers. The MLS system is a Multiple Listing Database that includes residential, multi-family, commercial, and land real estate listings for the purpose of buying, selling or leasing those properties through a central database.

However, at the present time, even though consumers are increasingly depending on the Internet to locate and purchase property, a system is not available or capable to process automated real estate transactions for the public. Furthermore, the current MLS Regional information system is only meeting minimal needs for real estate professionals.

Therefore, a web-based real estate system and methods are needed to provide buyers, sellers, and agents with the tools and services necessary to facilitate a real estate business transaction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

In overview, the present disclosure concerns systems, methods, and equipment or apparatus that provide, support or facilitate electronic real estate transactions and services for users of such systems and equipment and specifically techniques for providing and supporting such transactions and services online electronically thus assuring timely near real time access to such services for the real estate professional and consumer-alike. The systems, equipment, and the like rely on some form of connectivity, thus network, such as the world wide web or web, that may be any combination of wired and wireless networks. Networks of particular interest may be organized on a wide area network (WAN), such as the World Wide Web or Internet or local area network (LAN) basis or combination thereof generally in a structured manner and should be suitable for modest bandwidth communications.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs and instructions. It is expected that one of ordinary skill, notwithstanding possibly significant effort and many design choices motivated by, for example, available time, current technology, and economic considerations, when guided by the concepts and principles disclosed herein will be readily capable of generating such software instructions with minimal experimentation. Therefore, in the interest of brevity and minimization of any risk of obscuring the principles and concepts according to the present invention, further discussion of such software, if any, will be limited to the essentials with respect to the principles and concepts used by the preferred embodiments.

Figure 1:
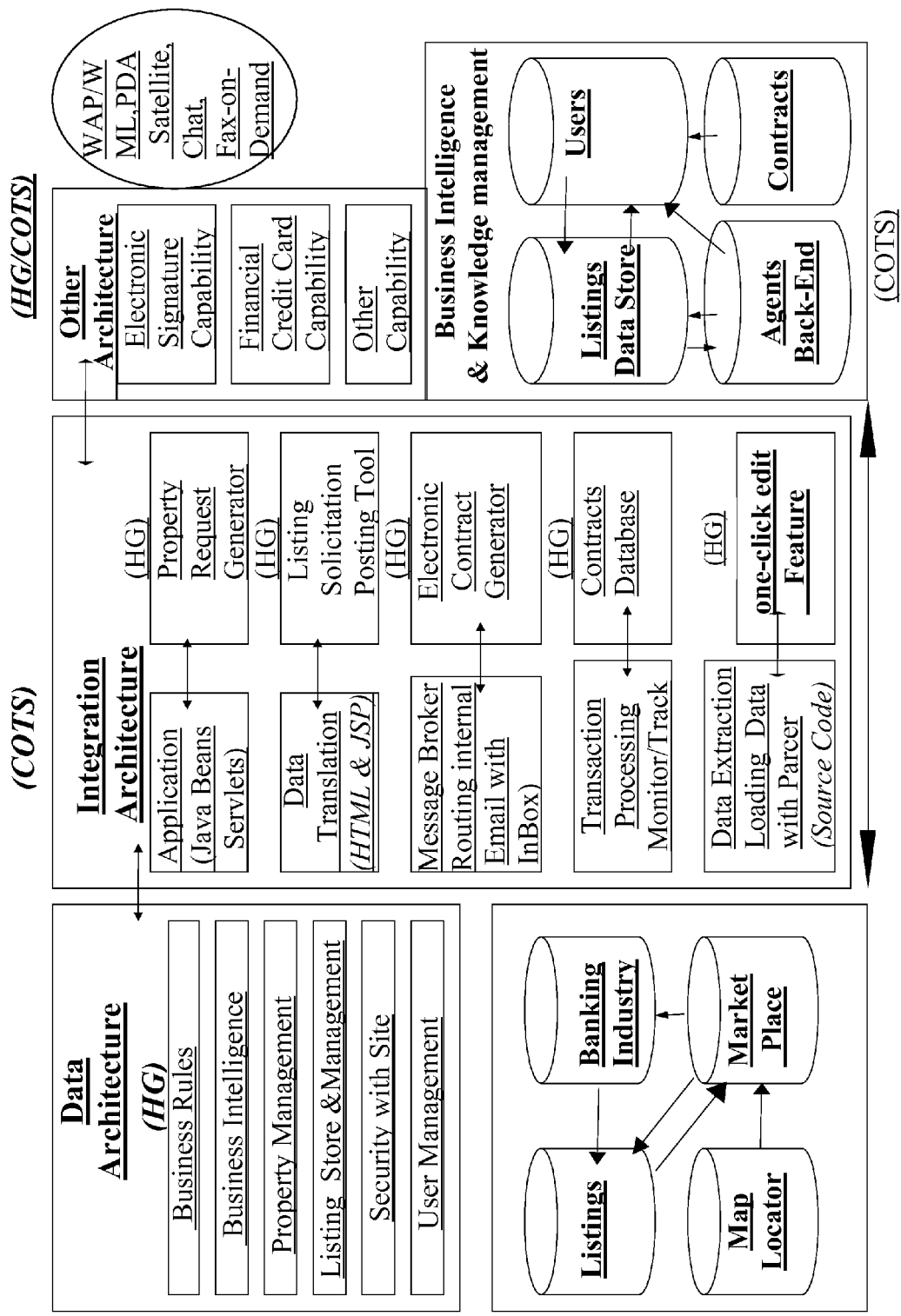
FIG. 1 depicts, in an exemplary form an Electronic Realty Transaction System.

Referring to FIG. 1, an Electronic Realty and Transaction System (ERTS) 100 according to a preferred embodiment of the present invention is realized through a systems architecture that emphasizes the use of existing processes and commercial off the shelf (COTS) products that are integrated with new and novel functionality to provide, for example, one-click-edit features, electronic contract-generation, and various databases as will be further discussed and described.

Figure 2:
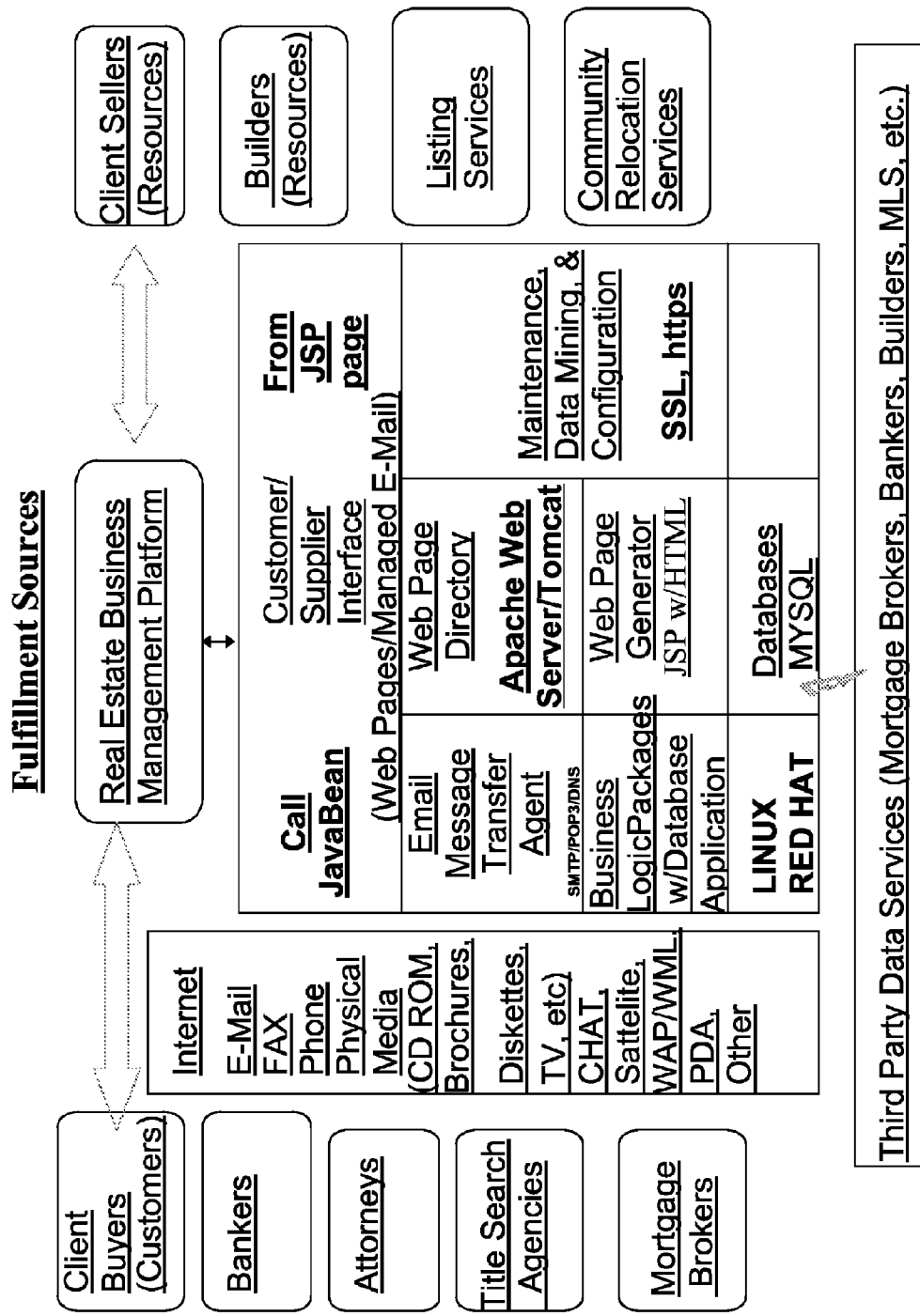
FIG. 2 illustrates a simplified system architecture with various interfaces.

As will be discussed further below, some of the key functional requirements of the present ERTS system include:
Providing a GUI (Graphical User Interface) on top of information provided by brokers and to be able to display all the necessary data and to use all the fields that are stored by the database in the system
Providing links to manage other real estate data
Exist as a living program utilizing the latest software and hardware technology available (or as it becomes available)
Using source code and business rules specifically designed for these business real estate processes
Sending email to involved parties to notify them of contractual issues
Using a web provider with high-speed throughput to make the system accessible via an Internet browser Requirements may be organized into functional groups. These groups represent major subsystems of the ERTS system. A detailed architecture is central to provide answers as to what the system is doing, though not necessarily how the system will perform. FIG. 2 is a simplified system group architecture, which pictorially describes how the system functions with the various internal/external-interfaces provided.

Figure 3:
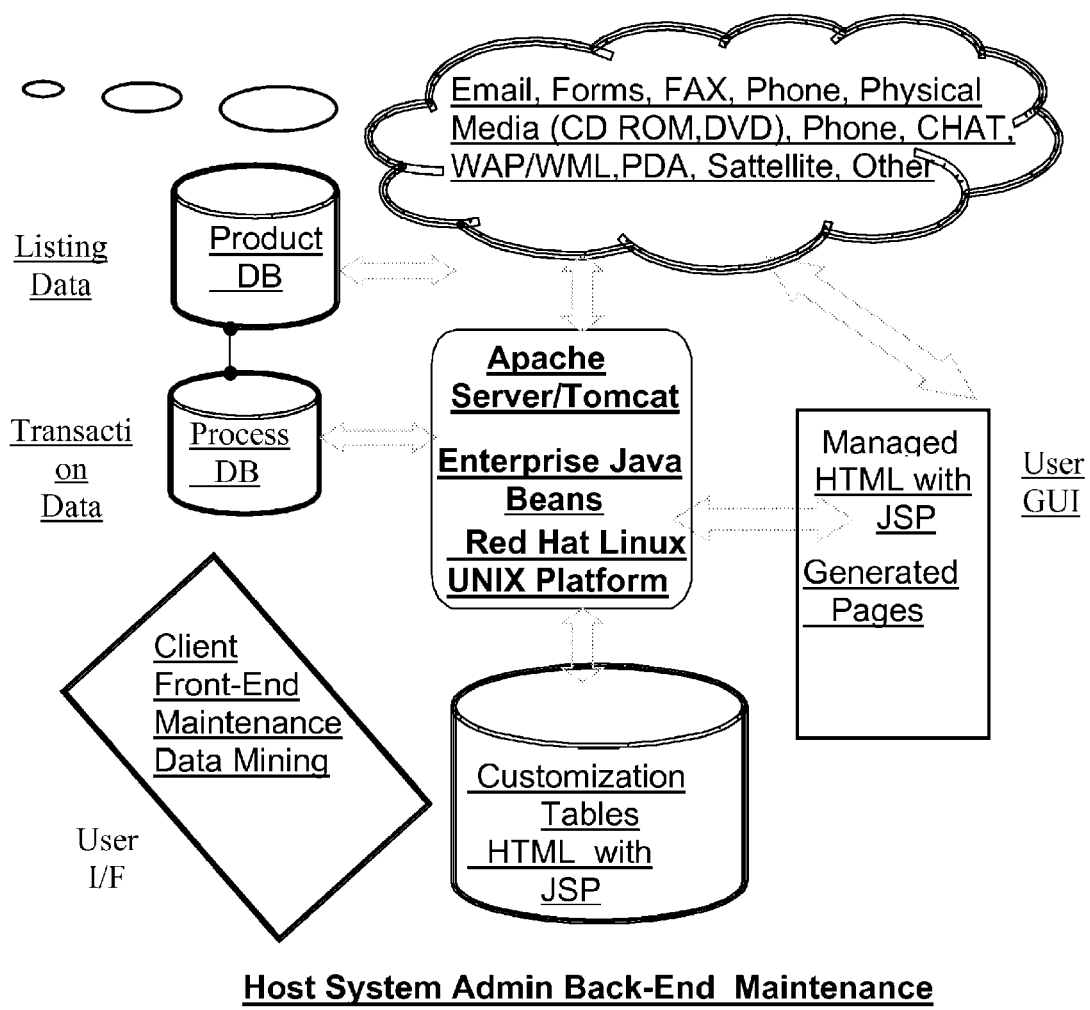
FIG. 3 illustrates a Systems level concept diagram that shows various performance and features of the system.

FIG. 3 is another illustration of interfaces within the ERTS system as well as interfaces to external environments. FIG. 3 is an example of a Systems Concept Diagram that describes the performance and design requirements for the system. For example, such requirements and thus functionality include elements such as:
A definition of the common usage's of the function
The performance criteria of the function being acquired, developed, and built
The components interacting and functioning ability
How the system functions together and how it will be designed As shown the resultant system has a plurality of components or elements, such as:
A user interface web page (HTML with JSP, Java Servlets, and Java Script)
An application program that processes user requests (Main Sub site)
Central Relational Databases (MySQL or Oracle)
A Database Management System (DBMS) to manage the data and communicate with the user interface (Admin Sub site)
A database System Administrator (Admin Sub site)
A system for tracking customer requests (Admin Sub site)
An external interface for resolving contract/listing and payment information (Java Code/JavaBeans)
Third party COTS software such as WAP, PDA, and Satellite
Ability to interface with Credit Card Companies and accept electronic or digital signatures
Certificate Authority (CA) certificates, to verify the authenticity of a certificate, to verity a signature, using secure transports (signed JAR files)

The various interfaces and functions shown in FIGS. 1, 2, and 3 together with hardware and software human engineering efforts drive, determine, or constrain the architectural features for the ERTS web-based system.

Figure 4:
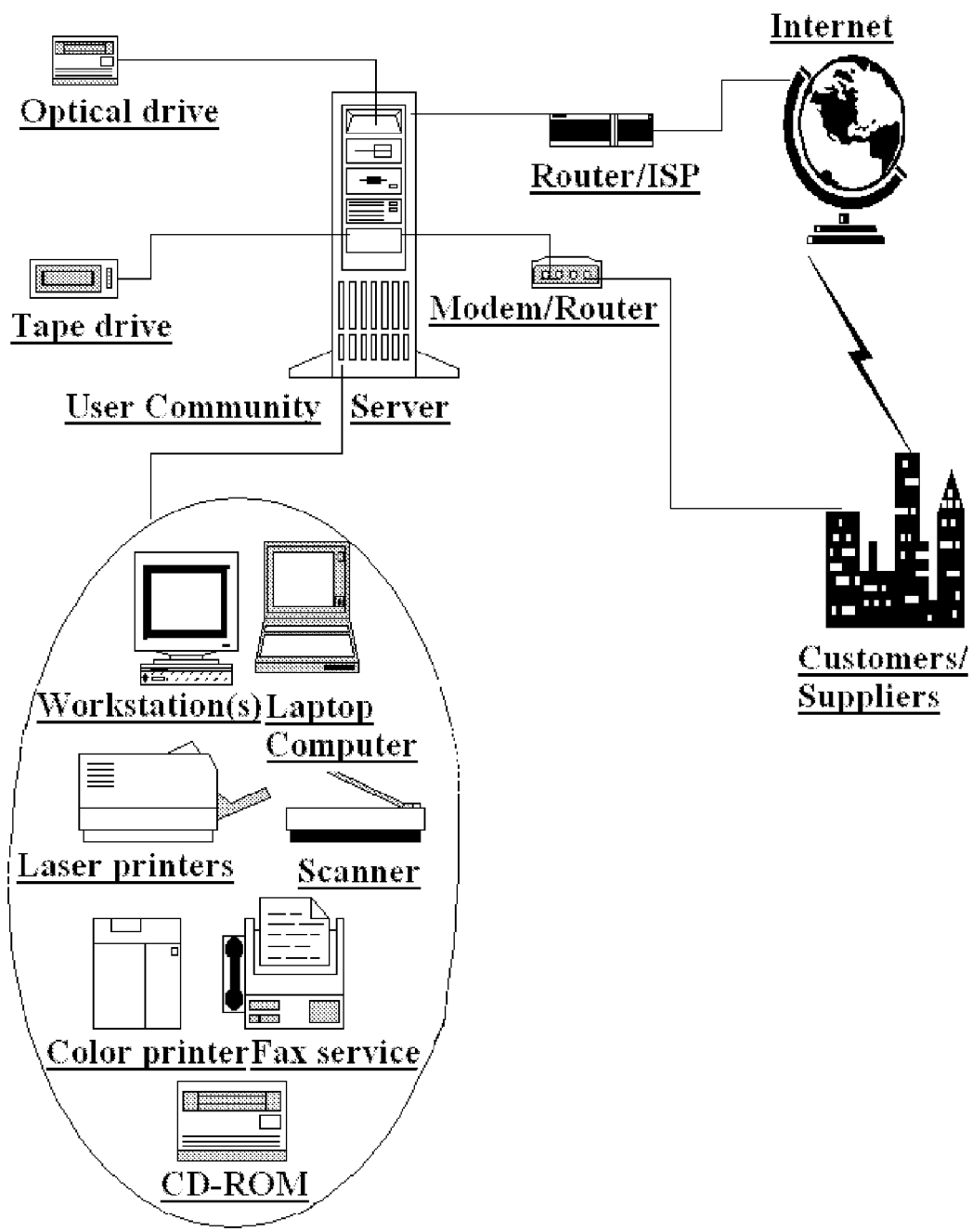
FIG. 4 depicts a hardware multi-tier client server architecture for the system.

FIG. 4 illustrates an exemplary physical architecture for the ERTS system and associated environment. FIG. 4 shows the physical framework for the design and what the system looks like when it is put together. The System Architecture involves functional, physical and foundation architectures. A software application supports a variety of users in the real estate market place, all requiring access to a shared/common database or databases. The architecture is determined somewhat by where data is needed, thus data flow and involved interfaces. Additionally, relational data needs and requisite data flows are thus involved in multiple interfaces thus having this influence. The system hardware and software environment for the application is supported by a multi-tier client/server architecture. FIG. 4 is an example of physical interfaces that may be required for the systems internal/external environments to interface and operate. This multi-tier or multi-tier enterprise architecture comprises the following components. Central Data Servers supporting a shared database management system (DBMS) that provides a centrally located place for shared data. This DBMS can be located on separate data servers or the same central server platform. Application Computer Server Applications are supported within the distributed configuration by hardware platforms that execute the applications functions. The computer server provides host computer services to a number of client workstations. Desktop Workstations to display and control application processes are provided by desktop workstations with Internet access. The automated software for the real estate system is web-based with multi-media technology.

The discussion below will illustrate the web-based electronic real estate transaction system of the present disclosure. Model views and diagrams that will be used to facilitate these discussions include the Use Case Models, Activity Diagrams, a Functional Decomposition Diagram, as well as the User and Admin Sub site maps.

Figure 5:
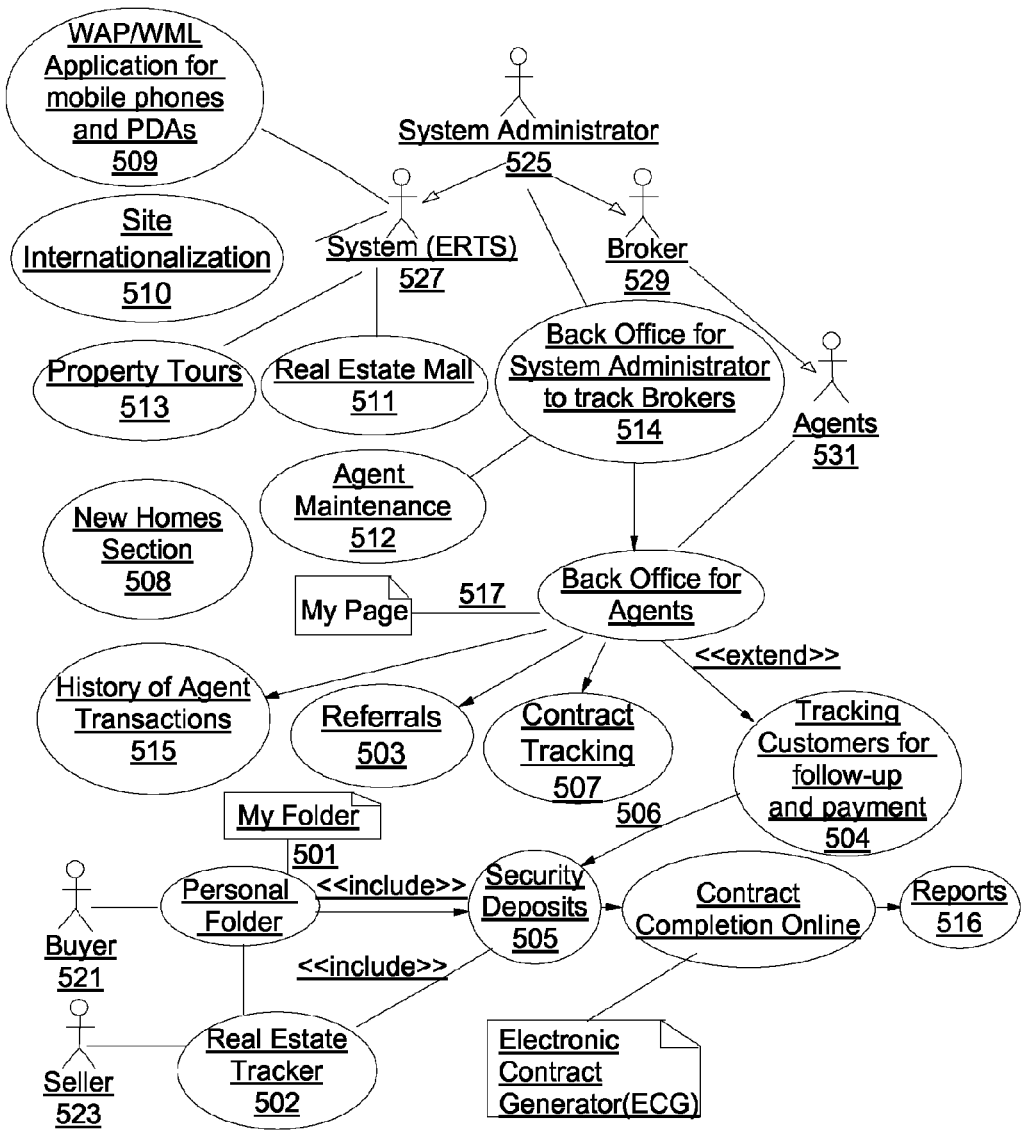
FIG. 5 depicts a use case model of the system depicting various features, functionality, and relationships.

Referring to the Use Case Model shown in FIG. 5, the requirements of or functionality provided by the ERTS system are shown. The Use Case Model or Diagram shows many requirements linked by the different Actors involved. The functionality required for the following elements or use cases is explained in further detail below. These elements include: Personal Folder "My Folder" 501, Real Estate Tracker 502, Referrals Handling 503, Tracking Customers for Follow-up and Payment 504, Security Deposits 505, Contract Completion Online 506, Contract Tracking 507, New Homes Section 508, WAP/WML Applications for Mobile Phones and PDAs 509, Site Internationalization 510, Real Estate Mall 511, Agent Maintenance 512, Property Tours 513, Back Office for System Administrator to Track Brokers 514, History of Agent Transactions 515, Reports 516, and Back Office for Agents 517. The relevant actors depicted in FIG. 5 include a Buyer 521, a Seller 523, a System Administrator 525, the ERTS system 527, Broker/Agent 529, and Agents 531.

The functionality of ERTS is constrained and determined by various requirements and internal functions that are often characterized or commonly known as Use Case objects or Use Case Business objects. As shown in FIG. 5 this functionality impacts and includes one or more of the Actors and Use Cases. Each Use Cases describes how the system can be used or captures in part the ERTS systems functionality. Each Use Case will yield an observable result of value to one or more of the Actors. Generally, a Real Estate transaction or process is or may be thought of as an integrated process comprising the aforementioned components or elements or the Use Cases listed above and described below. The Use Case View is one way of capturing and storing the Use Case Model. The Use Case Model describes the system and overall purpose with requirements and thus various functionalities. The Use Case Model captures the system functionality as seen by users and shows how the system is perceived by external actors using the system. Actors are human beings or other systems that are external and interact with the system. The Use Case Models may be used for one or more of:

Specify the context of the system
Capture the requirements of the system
Validate the systems architecture
Drive implementation and generate test cases Additionally included and discussed below are various Activity Diagrams that capture respective activities from the Use Case Model. The focal point of the activities is work. As an activity or action happens, the state changes, and actions are captured as results. The overall purpose of the activity diagrams is to model business workflows and operations. Although a Real Estate Transaction or Process can get quite complex, the use case and activity diagrams may be used to narrow down the processes so that they may be shown at a relatively high-level for case of understanding and for purposes of the present discussion. Next the respective use cases will be reviewed.

Figure 6:
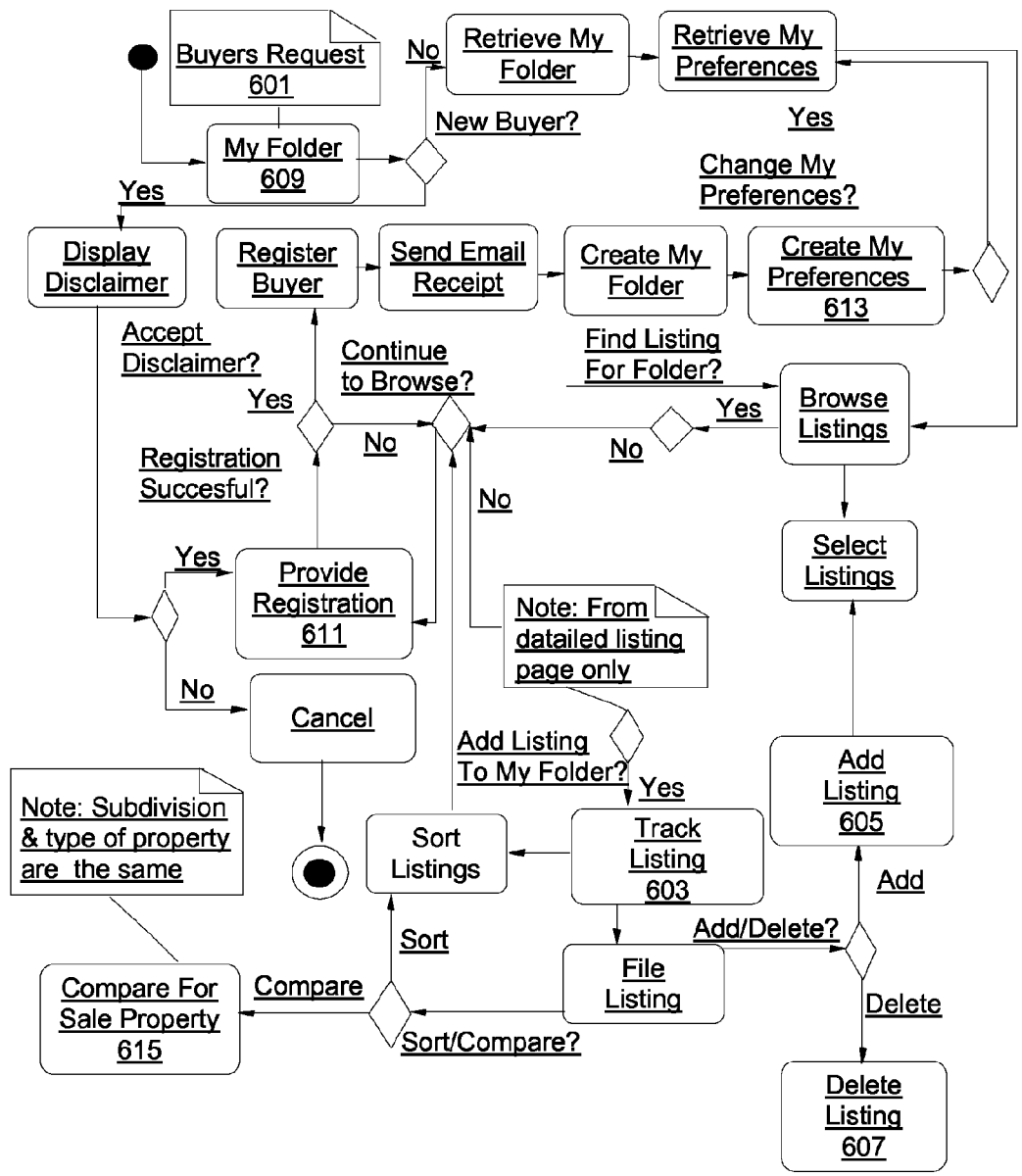
FIG. 6 depicts an activity diagram for one of the use case of FIG. 5.
Figure 7:
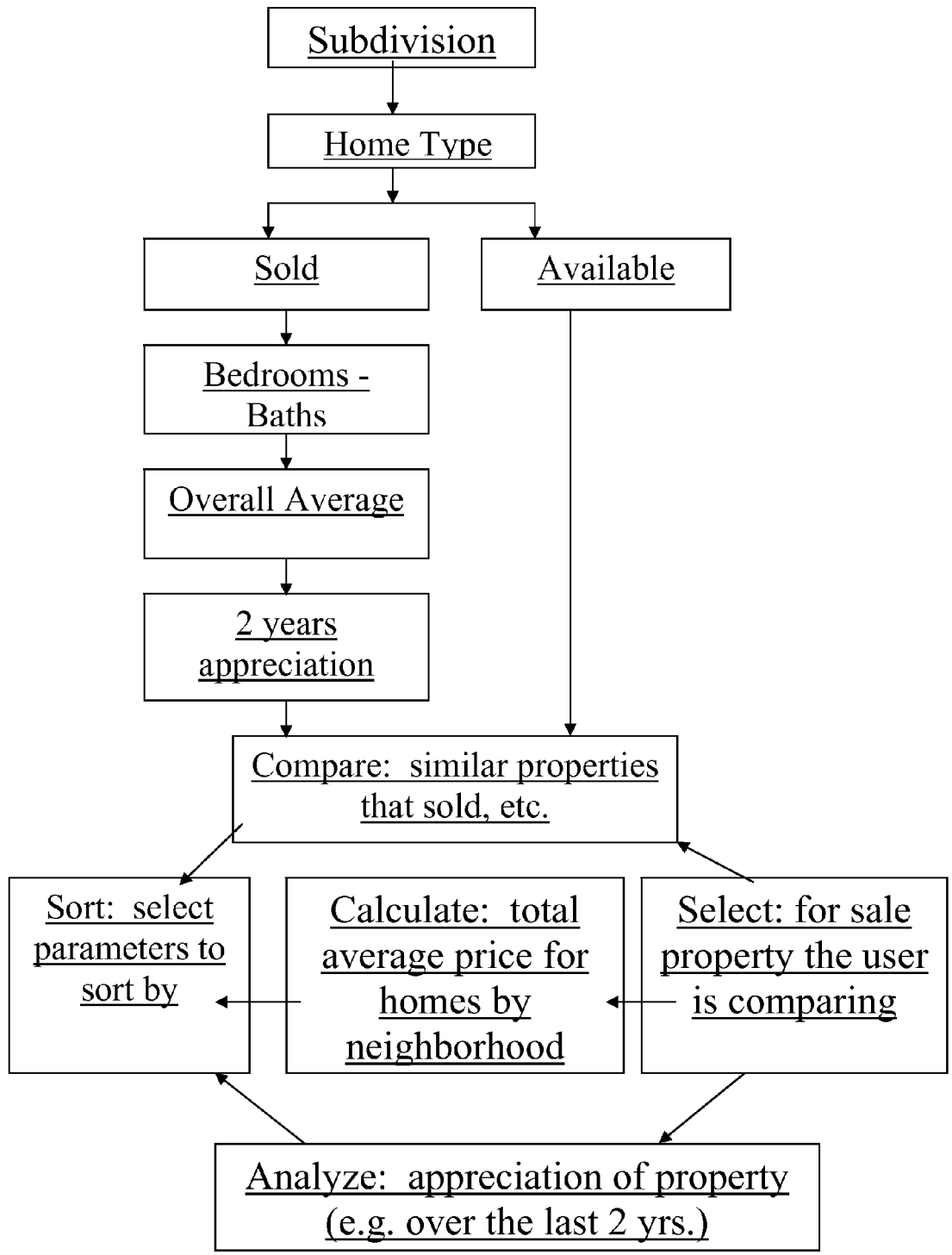
FIG. 7 depicts an exemplary situation of the FIG. 6 diagram in action.

The Personal Folder 501 including "My Folder", shown in FIG. 5, includes functionality that will allow a Buyer(s) 521 to register and once registered to add listings and the like to a personal folder. As shown at 601 in the activity diagram of FIG. 6, the personal folder will be derive a buyers request. The desired and available features or functionality are listed below with many of them depicted in the abbreviated activity diagram of FIG. 6 and FIG. 7. Some of the features are:

Track whatever a visitor looks at 603
Add or Delete (Remove) selected listings from "My Folder" 605, 607
Add, Modify, Save or Remove items from "My Folder" (i.e. upload docs, select preference lists, generate appreciation reports, or other folder contents)
Provide a logon screen and registration for the Buyer 609, 611
Order listings by creating a preference list (A property Wish List) for "My Folder" (i.e. by location, property type, price range, date range, or what is new on the market) 613
Notify a customer via automatic email once an availability match occurs from their pre-created preferences (i.e. ordered listings from a Wish List become available in the system, the system sends a property info notification automatically via email to that specific customer)
The system time stamps and records each user submitted preference or Wish List
The System is arranged to select and compare like or similar properties (see FIG. 7 for a more detailed review) according to the following model where the neighborhood and property type are the same (i.e. Subdivision, Hometype) 615
Calculate % of appreciation by neighborhood and analyze data (i.e. by selected fields such as neighborhood or subdivision, timeframe (months or years) and display the results, associated property photos, and a graphical trend analysis) FIG. 7
Provide sorting capability for a specific subdivision once comparison results are generated and displayed (i.e. by specific listing parameters, available fields) FIG. 7

For new entities or users who have not registered, a link can be provided from the home page for user registration 611. The registration page may advertise the advantages and requirements of registering as a Buyer, Seller, etc. It will provide each entity, Buyer, Seller, Broker, or Agent separate links once they have registered, (i.e. the System Administrator will activate or deactivate and thus provide this role-based functionality from the Admin Subsite registration page) A be provided for previously registered users to Logon from the home page. The menu bar of the pages that the registered user will view will be dynamically changed to add a navigation bar or menu bar and so forth. (See exemplary FIGS. 6 and 7). The form for registration will contain, for example, the following information: (*=required)

Personal Details:
*Title (Ms., Mrs., Mr., Dr., Other)
*First Name
*Last Name
*Mailing Address
*City
*State
*Zip
Profession
*Home Phone
Cell Phone
Work Phone
Fax Number
Pager
Gender (Male, Female)
Age Group
*Annual Household Income Range
*Home Owner or Currently Renting
*Registering with SYSTEM ADMINISTRATOR (i.e. to Buy or Rent)
*Home Type of Interest (Commercial, Residential; Land, Multifamily)
*Availability Requirement (Days/Months/Years/Immediate)
Account Details:
*User Name
Password
*Retype Password
Forgot Password:Details:
*Email (validation required)
*Mother's Maiden Name or Key Word
*Last 4 digits of Home Phone Number Upon successful registration, a page will be presented inviting the visitor to browse listings. The user's logon and password will be sent to them through email for use in future access to their account. In the event that a registered user has forgotten his/her password, the following will transpire:

Visitor will enter the email that they previously registered with
Visitor will enter mother's maiden name or specified key word and the last 4 digits of their home phone number (if successful, the user will continue to browse)

The system will send the user name and password through email to the user and store this data securely (i.e. stored by UserID with encrypted password)

The registered user will be able to add items to their personal folder from the detailed listing page. The attributes for the personal folder are: (*=required)
*Property Status (Sold, Available, Under Contract, etc.)
*Neighborhood (Subdivision)
Listing Date
*Sale Date (Date Sold)
*Listing Price
*Sold Price
*Days on Market (DOM-MLS/DOM-Property)
*Property Type (Townhouse, Single. Family, Condominium, etc.)
House Style
*Number of Bedrooms, Full Baths, Half Baths, Levels
Number Of Property Type Sold
*Address
*City
*State
*Zip
*Average Sale Price (Computed Column)
*Subdivision
*Subsidy (pulled from MLS system)
*Comparison with time period (i.e. two years prior, and calculate the property appreciation)
*% Change according to comparison calculation above For all users, the navigation bar and menu bar links on the page, will dynamically change and display special folder options. The registered user will be able to create a cabinet, create a folder for that cabinet, and add items or view their real estate contracts. Listings can only be added from the properties additional details listing page, and all other documents may be uploaded with an upload button. Registered users will be able to add or delete files from their own folder only and dependent on their user role. (i.e. according to their UserID) The "My Folder" functionality:

The system will have storage cabinets that contain one or more folders for storing selected properties (i.e. listings and property contracts). Each user will have one pre-created contract cabinet and folder to store their listings or property contracts. The pre-created folder may also be pre-named.
  The user will be able to add or delete the contents of their file cabinet (i.e. only file cabinets that the user previously created or named), and user created files or uploaded file contents (i.e. the user will not be allowed to delete system pre-created files or its contents).
  The user will be able to add, delete, modify and save personal preferences lists for listings, (i.e. specific Wish List/Preference List) by establishing the search settings for the system to locate their property preferences.
  The system will track each listing a Buyer saves to their personal folder. Each listing in the database will have hit counter functionality that will store numeric results for listings each time the listing is viewed by a different and unique user and may be viewed under a listing picture (i.e. by PropertyID Hits are displayed for each active property on the initial property search result page, additional property details page, and Seller's "My Page". Once a property is sold, any active hits for that property are archived and no longer displayed.

Operating "My Folder":

Each operator has a personal home page called the Desktop. A User name appears in the top, left-hand corner of the web page. The Desktop enables you to perform tasks in the system associated with your operator roles. The system (ERTS) has function bars, such as:
    The Navigation Bar that may be on the left side of the screen (displayed vertically)
    The Menu Bar that may be along the top of the screen (displayed horizontally)

The Navigation Bar allows you to navigate through or process your contracts. It contains the InBox, File Cabinet, and Folders to hold your contracts and preference lists, as well as selected listings captured from the additional property details page. The Menu Bar enables a user to perform a variety of tasks within the system based on the user roles the System Administrator grants a user within the system. A function to Create Contracts only allow users, such as Agents and Brokers to access these functions based on their user roles. A user can access his or her Desktop page at any time by clicking on Desktop from the Menu Bar. (See below)

Figure 8:
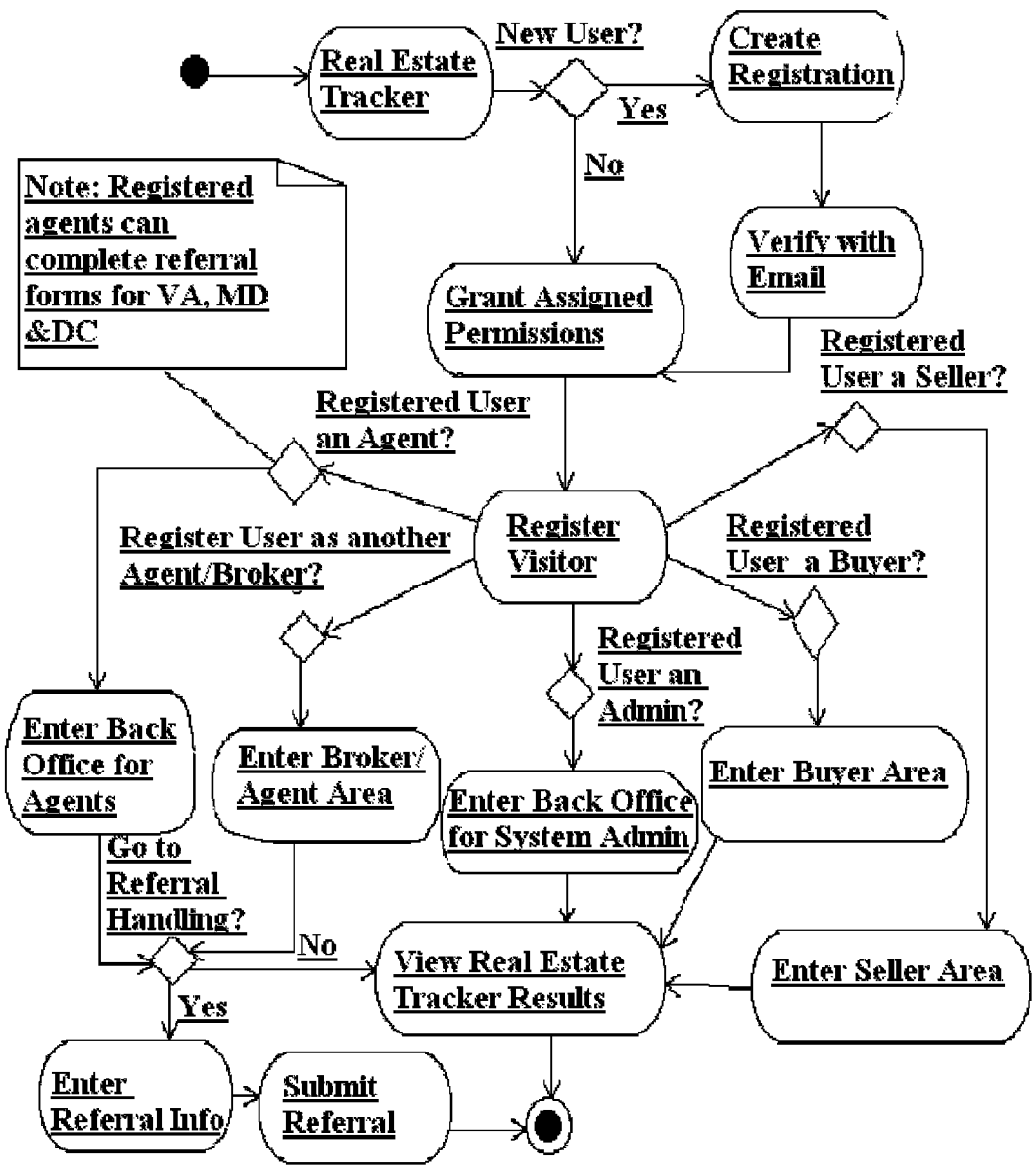
FIG. 8 through FIG. 11 depicts various activity diagrams for additional ones of the use cases of FIG. 5.

The Real Estate Tracker tracks the contents of "My Folder" for registered users of the site, and tracks the number of hits for each active listing. An exemplary activity diagram of the Real Estate Tracker is shown in FIG. 8. The system may automatically count the number of hits based on each listing stored to a users personalized folder, "MyFolder". General web statistics regarding the total number of visitors (IP Addresses, etc.) are collected and provided via known techniques. The following functionality is desired and provided by the Real Estate Tracker:

Available to all registered users (Buyer, Seller, Agent, Broker, Administrator, or Third Party)
  Track and store hits on properties advertised by tracking users adding listings to their personal folder
  Provide a hit counter on the initial property search results page and from additional details listing page
  Track users adding listings to their personal folder
  Allow other designated users to view another users personal folder, such as displaying hit info about a Sellers listing to the Seller (integrate into Sellers, and Agents desktop page area. "My Page")
  Display hit info about a Sellers listing to the Seller (integrate into Sellers, and Agents desktop page area, "My Page")

Registration of Customers or users of ERTS, (Buyers and Sellers), Agents, Brokers, or Third Party users will encompass separate user-based roles and represent distinct and separate business entities and assume different business functions. Customer Sign-In (Both Sellers and Buyers) are exposed to and presented with one or more of the following:
  Legal agreement and disclaimer
  Becoming a site subscriber seller or buyer
  Advertise features of application to encourage subscript
  Handle promotional pricing
  Sign or make comments to real estate forms online
  Add mask for property listings to show all Buyers, Sellers, Agents and Brokers Brokers listings that they are allowed to add, delete, modify, make comments and view
  Filter property listings to show properties by Broker Organization (i.e. by Broker code)

Figure 9:
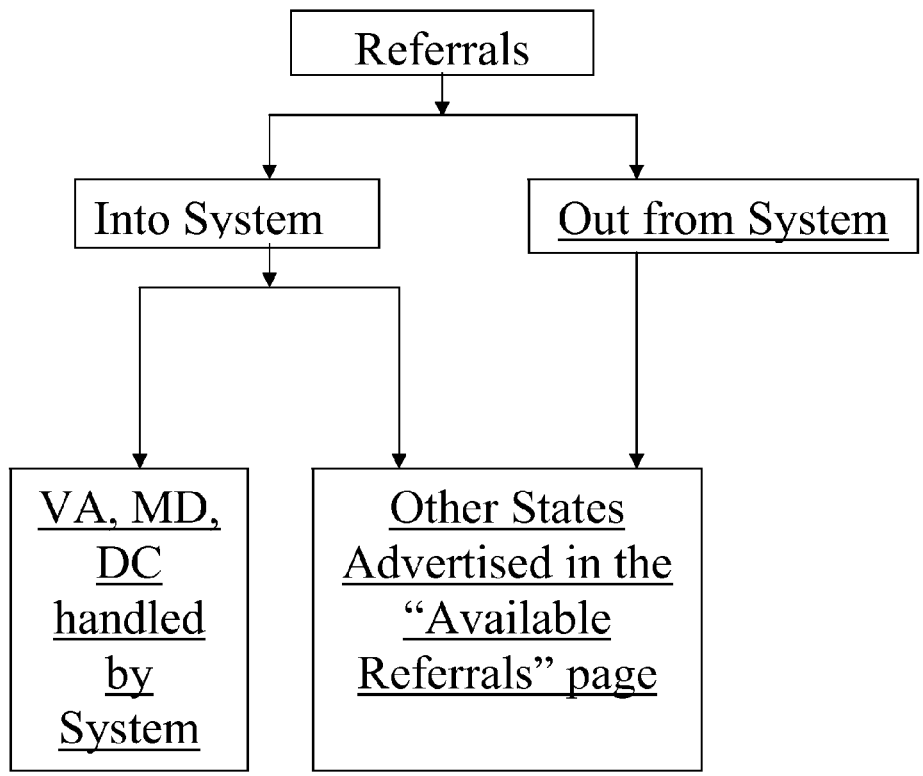

FIG. 9 is an exemplary flow diagram, which depicts how referrals flow into and out from the system. The following functionality is desired and provided by the Referrals process:
  Referrals Handling: (Agents and Brokers)
  a) ERTS system or Agent refers customers into the system or system administrator:

Agent signs in and fills out the referral form and then submits the form to their Broker for signature. (a requirement)

Other Broker agrees to transfer customer, inputs % commission, and signs the form. (requirement)

The System or System Administrator or Broker approves and confirms % commission to referring broker and to agent: Only for customers within a specific geographical area, such as VA, MD, or DC Metro Area System identifies and discloses customer and specific area to the other party Referral form is tagged by the system as finalized b) The system or system administrator refers customers out to other agents: (administration web site area)

Referral for other agent necessary (may need to find an agent match)

Registered agents can sign in

Registered agent submits request to final referral agent (Listing and Selling Broker signatures are required for final approval)

Information will be stored on location of customers buying area or selling area

Information and details about customer will be stored with property details based on selling and/or buying information All Agents involved need to reply to the agent commission agreement (provided from the system or system administrator, this is a requirement that must be validated by the system, then permanently stored in the database)

The system displays the commission agreement. If the agent accepts the commission agreement, both brokers must sign off by manual process (fax), or digital signature via the system Referral form is tagged by the system as finalized Both processes work essentially the same way, with the basic difference being that referrals into must be restricted to a geographical, VA, MD, DC or any other area defined by the system. This is further described below:

The business logic behind the Seller and Agent registration process will be similar. A hidden column attribute will be set to identify the registered user as a Seller or Agent. Prior to registration the visitor will have to accept a legal agreement and disclaimer as well as accept/sign with their signature. A copy of the registered Agent license is required in ordered to have the referral amount paid.

Agents will be able to create and complete real estate forms online, and store them to the system. Each real estate agent will be able to access standard real estate forms that are populated in a post descriptive file (pdf). This comprises information from buyer requests for a property contract and from sellers requests for a listing contract. The real estate contract form is populated with specific fields from database information. Then, a decision algorithm is used to determine, the real estate contracts and associated documents needed to be used by the system analyzing information such as state, address, owners, year property built, etc. to complete a real estate contract transaction to be ready for approval. Agents can set up a workflow to notify the Seller, Buyer, Selling Agent, Buying Agent, or Third Party user (when/if applicable) about their completed listing or property contract. Buyers, Sellers, and Third Party user will only be able to view, make comments or upload additional documentation if applicable to their real estate contract.

The Selling Agent, Buying Agent, Brokers can view the submissions and add property listings or property contracts to the web site. Also, the system has an automated parcer that can electronically upload multiple listing system data from the MLS system and add, update or delete listings from the existing database for the site. This data from MLS is one source of data for use in auto populating a listing or property contract.

Registered Buyers, Sellers, Agents, Brokers, and Third Party users will have a different personalized page, "My Page". "My Page," will only contain information of interest to specific web users, such as, hits on their listings or display information on their listing or property contract. For Registered Agents, "My Page," will also contain their referral information, Buyer Requests and Seller Requests, and any referral that has been forwarded directly to them by the system. The "My Folder" functionality is provided to registered Buyers or Sellers, to work with their Agents and Brokers or Third Party users on their real estate transactions relating to their property. This includes the identification of their Agent, Property Details, Property Type, Contract Status, Listing Date, Selling Date, items to Complete, Items Complete, Title Company, Settlement Date, Time, Location and Related Phone Numbers, etc. Each Agent will be provided with the ability to grant authority for user privileges and be required to select their customers for the property to be displayed to them via their "My Page" (i.e. Property ID).

Referring to FIGS. 8 and 9, registered agents should be able to complete referral forms online and the system, or system administrator will be able to facilitate referral transactions. The following functionality is desired:

Agents can refer customers to the system for properties in the defined geographical areas, such as the exemplary MD, VA and DC The system can refer customers to other Agents outside of geographical areas MD, VA, and DC; or any other areas in or outside the U.S. (i.e. only Brokers may assign referrals to their individual agents)

The system can pass referral requests from Agents to other Agents and send a commission change or charge receipt (the system monitors and tracks the status of the referrals based on the date created. It also automatically tracks any follows-ups with users until the property closing or settlement has occurred)

Customers and referral customers can be sent to the system for properties in the exemplary MD, VA and DC areas or any other areas in or outside the U.S. (i.e. only Brokers may assign referrals to their individual agents)

Each different referral situation or ticket is tracked and handled based on how it was referred, when it was referred, and what the final outcome was.

For Referrals into the system:

Agents signs in and fills out referral form (i.e. Broker signature must be received)

Other Agent agrees to transfer customer (i.e. Other Broker signature must be received)

The system accepts and confirms both transactions occurred

For Referrals out of the system:

System displays generic info on referral listings (i.e. specific customer info not revealed)

Agent fills out form and signs agreement (i.e. Broker signature must be received)

Electronic or digital signatures or fax exchanges are other ways to transfer the referral form (i.e. other Broker signature must be received)

Upon agreement and confirmation (all Broker signatures obtained) customer information is exchanged In implementation terms Registered Brokers, Agents, Sellers and Buyers will be able to complete referral forms online and submit them to the system electronically or via a document upload capability. The form will include legal language regarding the commission agreement in order to transfer the customer for the real estate transaction. The system will then trigger an email through the system that a referral form has been received. The Agent and Brokers will then be able to view the details from the Referrals area and confirm the agreed to commission. (i.e. all Brokers signatures must be received). Upon confirmation, the system will store and trigger an email to the Agent and the referral will appear on the Agent's "My Page."

When the system administrator captures a customer who needs real estate services that cannot be provided by the system, (i.e. interest is outside the VA, MD, and DC Metro area) the system or system administrator will be able to solicit interest of other registered licensed Agents in the specified state. The system will do this by sending (pointing) available referrals to an "Available Referrals" page. (i.e. where generic customer info is displayed). Any registered Referral Agent will be permitted to view and then process a referral form to apply for a selected referral. (i.e. customer information will not be revealed on this page) The referrals will appear as hyperlinks and clicking the available referrals link will enable the registered licensed Agent to complete the Referral Agreement form that will then trigger an email to invoke the business process as stated in the paragraph above. If the system accepts the interest of a particular remote Agent, the referral hyperlink will automatically be removed from the "Available Referrals" page.

When the system receives a referral that is to be transferred to another Agent, the referral will also be advertised in the "Available Referrals" page. If another Agent expresses interest in that transaction, the system will track that referral assignment with each Agent or Broker. Processes requiring signatures of the various parties will take place manually or digitally and the database will track these transactions and signature types and status of each referral.

Figure 10:
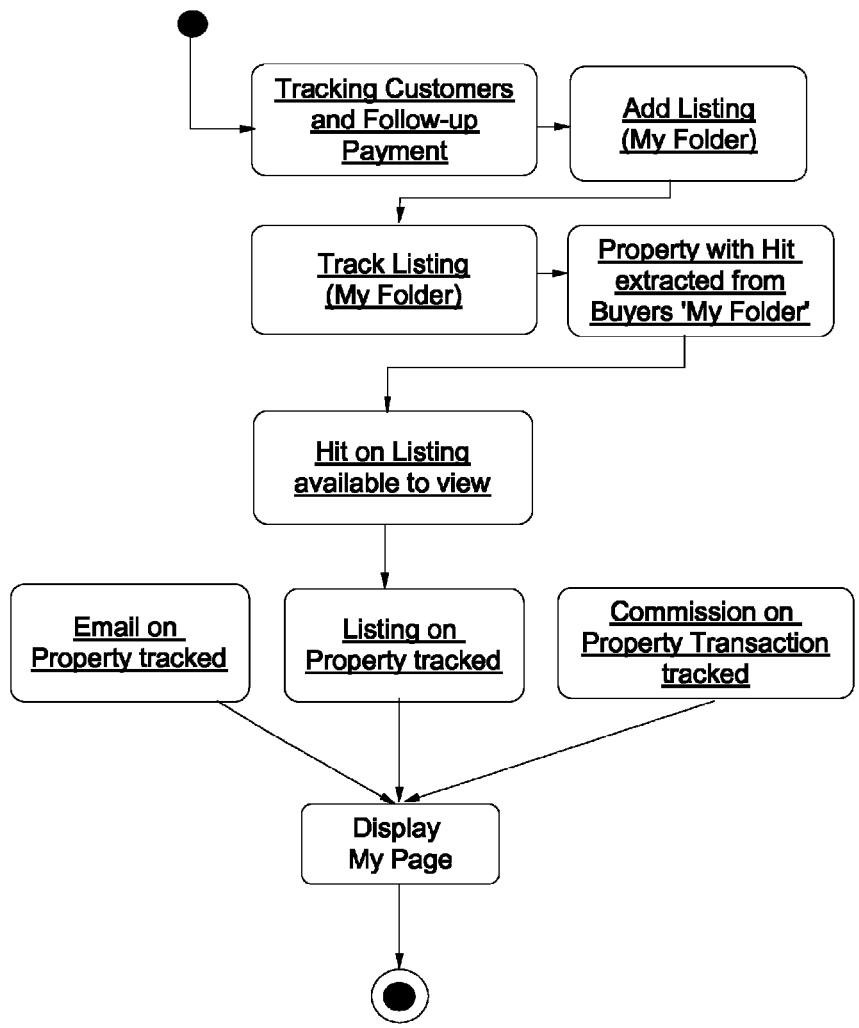

As shown in FIG. 10, the system administrator and registered Agents or the ERTS system can track customers for follow-up and payment. All registered Agents are able to follow-up with their customers and verify or request payment. This entails the following:

Listed properties that are getting hits will be made available to the registered Sellers, Agents and the Brokers.

Emails regarding interest in properties are tracked by the system.

Commissions for all possible transactions are tracked by the system until closing or settlement. Once a listing is sold, revenue will be tracked. Revenue may be tracked on a daily, weekly, monthly, and yearly basis, based on Brokerage Organization.

All information on property listings for Agents and Brokers that are getting hits will be extracted from the "My Folder" page, and will be displayed to the listing Agent via "My Page." Clicking the additional details link will take the Agent to the details of the listing. Links from this page will enable viewing and editing of the transaction history for the listing. The system administrator will have similar viewing, editing, and transaction tracking capabilities for all properties. The system administrator will be able to separately view listings in the Buyer's "My folder," and associate the listing with the Seller or listing Agent for follow-up.

The administration section of the application will have a history table to track and record details of each email solicitation and also display links to an area for Buyer Requests and Seller Requests. With the above, the system will be able to track all possible real estate transactions to settlement. This option is available for the Agents and Brokers. This includes all leads and existing customers, (i.e. customers from the system or customers from an email solicitation). The following fields will be used to track real estate transactions, based on Listing and Selling Brokerage Organization:

Name
Address
Email address
Customer Address (Mailing)
Customer Property Address (MLS)
Comments
Open/Close Status
Commission (%) and Dollar Amount
Copy of HUD is sent with the referral check (i.e. this closes the transaction)

Note that email tracking may be done from within or without the ERTS and essentially includes or considers:

Get an email from, for example, the web site and store it in a database
Raise alert flag if not responded to
Option to classify (by Buyer, Seller and Agent)
Filter emails
Forward emails to agents
Use a standard interface, such as Microsoft Outlook (MAPI)

Figure 11:
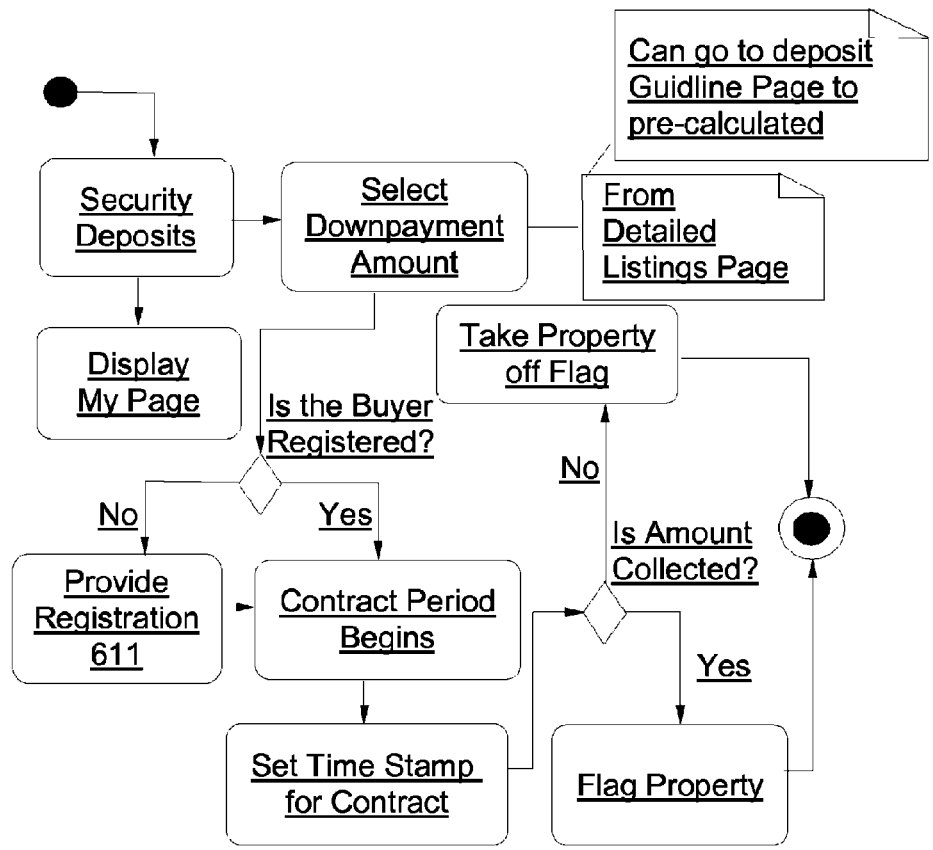

Referring to FIG. 11, the application will enable Buyers or Renters to place security deposits on all types of properties they wish to lease or buy until the transaction is complete or settled (i.e. a settlement occurs and the transaction is closed). A link will be provided on the detailed listing page of a property inviting the customer to place a security deposit. The link will invite the customer to login if the customer has not already done so. Unregistered customers will be taken to the registration page. The User ID can be used and passed as a global variable through out the login process.

The submission of a security payment or deposit will take place on a form with the customer details (autopopulated from registration) and the calculation of a reasonable security deposit will be validated by the system for the property desired to be purchased or rented. The security deposit amount will be determined by the value of the sale or lease price. A link will be available for the Buyer to use a recommended "Security Guidelines" page to calculate a reasonable security amount based on the property criteria to help them verify and estimate the appropriate deposit or security amount for the property. Calculations (by the Listing ID) for a security deposit will include the option to automatically populate a credit card form. The form will also ascertain the preferred payment method and ask if the customer wishes to make an appointment to view the property or ask if they have already viewed it. When the user submits the form, the system will display a disclaimer that the availability cannot be guaranteed and then automatically trigger an email to the system administrator while recording the information in the database. The customer will also be encouraged to get in direct contact with the Agent or Broker of the property. The Agent will then review the security submission through their "My Page" agent area, and make changes if necessary. Then the system will send the accepted security information in the customer's "My Folder". The Agent or system will send an email with a link informing the customer to submit the security payment via credit card. The customer can click the link and enter their "My Folder", if payment by credit card was indicated as the preferred mode of payment during the security deposit.

On receipt of the email the customer will log into the system and view the contents of "My Folder" where a hyperlink "Make Security Payment" will appear. Clicking this link will take the customer to a secure (https) web page area of the application where the payment can be securely made. This part of the application will require the services of a third party vendor, offering credit card processing via SSL. The customer and Agent will get an email notification of the completed transaction and the information will also be recorded into the database. Recorded security deposit fields may be as follows: Customer Name, Credit Card Info, Amount, Transaction Date and Authorization Approval Number, and some credit cards may require a 4-digit pin code, (i.e. American Express)

Figure 12:
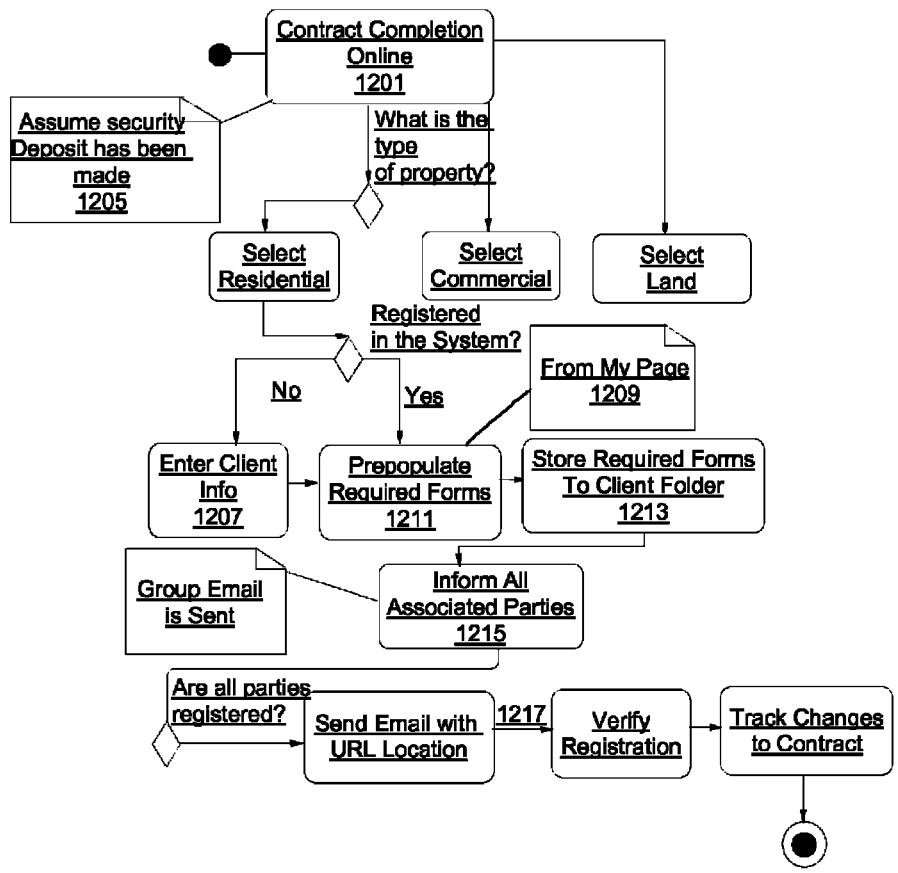
FIG. 12 depicts an activity diagram at a high level of the contract completion online use case of FIG. 5.

As shown in FIG. 12, a Contract Completion Online feature or Electronic Contract Generator (ECG) will enable the completion of or generating of real estate contract forms online to facilitate real estate transactions more efficiently and effectively. The Electronic Contract Generator (ECG) is described in more detail below. The prerequisites for completing real estate contract forms online 901 include:

Property must be identified (i.e. by a willing and able buyer and be an active listing, e.g. a "For Sale" or "Far" Rent" listing) 903

A security deposit must be made (i.e. either manually by check or automatically by the online credit card transaction processor by bank transfer) 905

If the client is not registered in the system, the Agent or system will manually enter the customer and property information into the database 907. The Agent will then inform the recipients. All registered Agents and Brokers will have access to real estate forms from the "My Page" area 909. The forms will be converted to a standard format, (i.e. an Adobe PDF format). The forms will be able to interact directly with the user interface and the database. The system will pre-populate the required contract fields upon creation 911. The system will upload other forms and documentation that will be stored for the related property and placed in the associated customer folder via "My Folder" 913. Any changes to a customer account will trigger an email 915 for the client to check their account. If the client is unregistered, the email will include a link with the username and password including instructions as to how to logon and complete a registration 917.

If there are any questions or concerns from the Buyer or Seller, they may be handled by the Selling Agent or Listing Agent outside the system boundary (i.e. phone calls, fax exchanges, chat, etc.). The system will allow updating and correction of forms until the parties are satisfied and have reached an agreement. There will also be a make comment functionality to store additional details, comments, or requests for the contract. The involved registered Agents will be informed, when the Buyer or Seller signals acceptance of their online contract forms, via an email and by pages that will display relevant changes or updates in status by tracking the history of a contract. Any completed contract can be uploaded manually if the Listing, and or Selling Agents wish to process forms manually and the contract can be uploaded and stored online. If the property listing belongs to the Listing Agent then, the Listing Agent will inform the Selling Agent via email and make the contract available in the Agent and Customer areas via their "My Page."

Figure 13:
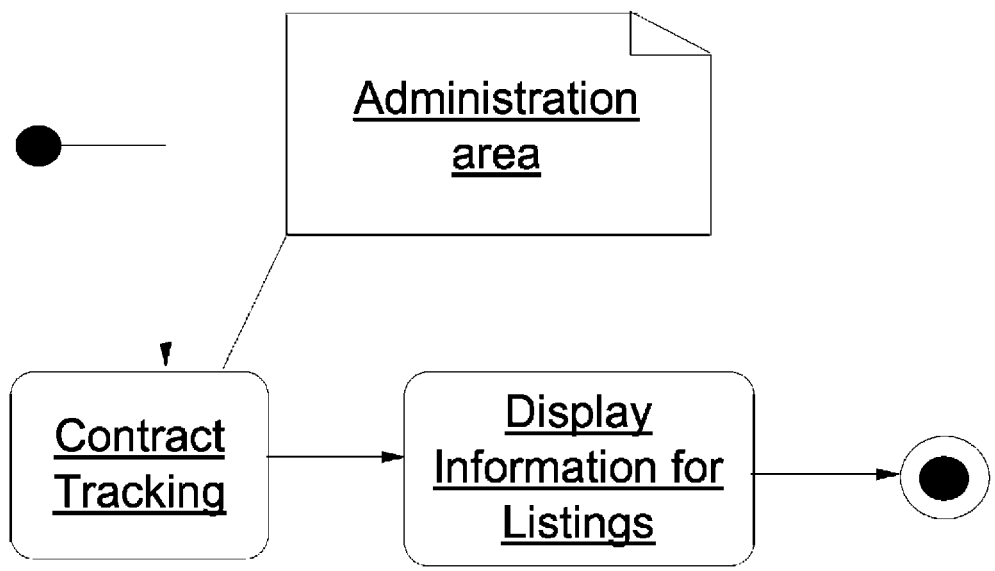
FIG. 13 depicts a an activity diagram at a high level of the contract tracking use case of FIG. 5.

As shown in FIG. 13, an administration area will be provided to the Agents and Brokers to track all contracts and their statuses for all system listings and property contracts pending, cancelled, withdrawn, or settled. The administration page will automatically draw information for specific listings under negotiation and until settlement. The following fields will be displayed to facilitate contract tracking:

Type of Property
Property Address
Listing Broker (Mailing Address) and Listing Agent Info
Selling Broker (Mailing Address) and Selling Agent Info
Purchaser Info (Mailing Address)
Seller Info (Mailing Address)
Transaction Status The new homes section will contain a listing of new homes and will have the "My Folder" functionality. A link will be provided from the main page to the New Homes section. The New Homes section will contain specific details, such as:

Listing of new homes including images
Year Built and Age
Builder Information (only on display in admin area)
Type of Property
Availability The WAP/WML and PDA application extensions will allow users of WAP/WML enabled phones or devices to download information from the system via the Internet. The main home page will include a link to a page advertising specific WAP/WML or PDA features including:

View listings and listing details
Allow registered users to logon and view "My Folder"

Depending on the type of wireless device, the system will need to support specific communication protocols to download the information. The system will need to support these application extensions to provide the above capabilities.

The system is expected to be viewable in multiple languages and support international real estate-transactions via the web. A pull-down menu will allow users to select their language of choice. Below are two possible methods to implement language translations:

Via Java Servelets that are derived from the Java Language classes
Via a third party software residing on the web server (i.e. such as the WebPlexer International Language Server)

The language choice options will be provided on the home page and will allow viewing of the entire site in the language of choice. The languages that need to be supported are: Spanish, French, Japanese, Chinese, Arabic, Korean, Hungarian, German, and Others as required. Languages can be added very easily if additional language choice options are needed.

The purpose of the Real Estate mall feature is for visitors to shop for goods and services that are associated with buying, selling or leasing property. A Real Estate Mall page will display applicable real estate links. The system administrator will be able maintain the Real Estate Mall page by adding, editing, or deleting hyperlinks for businesses providing real estate services. These businesses will be grouped and displayed by category as applicable. The user will be able to view all categories or select a specific category from a drop-down menu, radio button or hyperlink. The following categories have been identified: Title Companies, Termite Companies, Moving Companies, Mortgage Loans, Local Cable and Phone Providers, Home Inspectors, Appraisers, Lawn Care Companies, Home Furnishings, Home Improvements, Handymen, Interior Decorators, Window Treatment, Lock Smiths, Local Baby Sitters, Local Dog Walkers, Local Home Cleaning Services, Local Entertainment (i.e. movie Theaters, Restaurants, etc.).

The Agent Maintenance area allows the system administrator to add, edit or delete Agents to and from the database. This information includes contact details for each registered Agent by Brokerage Organization.

The system supports property tours and will provide a method to associate listings with their own individualized virtual tour. Slide tours will be displayed with motion, animation, and video. Java Applets or a third party software will be utilized for this implementation. The system will provide an automated upload capability for uploading various file types (i.e. pictures). Listing presentations will be uploaded to the Web Server and have a hyperlink from the listing detail page inviting the visitor to take a virtual tour. Slide tours may be available in short medium and long formats with differing numbers of slides, such as 1-4, 5-10, and 10-15 in each format.

The Back Office for the system to track Agents and Brokers is a feature that allows the system to monitor and track agents and brokers. The page will produce a summary of information by brokerage companies that will provide information including Sales tracking, Leads tracking, and Agents commission tracking.

The History of Agent Transactions allows the system to track the history of its agent transactions by tracking information such as the following: Agents name, Property address, Transaction type (Sale, Lease, or Listing), Sale price of property and Sold price of the property, Both sides of Agent Commission (%), Deductions (miscellaneous real estate fees), Associated Dates, and Listing Status. Functionality's will include save, modify and delete, and as much of the information as possible will be auto-populated via the MRIS Server Real Estate Transaction Server (RETS), County Tax Databases or other real estate related databases.

The report section allows the system to generate reports. Exemplary reports include: Reports to Analyze Agent productivity, such as Total rent/overall sales (sum of sale prices/Agent) and Overall sales per property type, Reports to Analyze System Productivity, such as Overall sales, Overall sales per property type (i.e. include MLS Number), By county (i.e. Fairfax, Alexandria, Arlington, etc.), or By state, Status reports of incomplete transactions, such as, Active (i.e. money to come), View details of and link to each case process form. (i.e. by ability to review by each agent case), Under contract, and Rental Applications, and Status reports of dead transactions: (i.e. canceled), such as, Expired or Withdrawn (i.e. money lost) listings, View details of and link to case process form (i.e. review by each agent case), Expired or Withdrawn Listings, and Expired or Withdrawn Rental Applications The Back Office for Agents is provided for registered Agents to facilitate their business activities. Registered Agents will be able to login and based on User-ID, will be taken to their personal page, "My Page". This page will contain, for example, links to the following: Listing Contracts, Sale Contracts, Canceled Contracts, Leases, Case Processing Entry (i.e. each registered agent has a considered case record, where he or she can keep their transactions, and keep their tax deductions by year), Report on their commissions, and Entry form for deduction details.

Additionally, there are forms for Agents, that allow the System to download and complete contract forms (i.e. system auto-populates customer contract fields if customer is previously logged into the database), Save to a folder by his/her system account (i.e. navigation file cabinet with folder to store info), Print forms and reports, and Email forms. The following documents are required for the web site:

Legal forms and agreements for or regarding registering Buyers, Sellers, and Agents (i.e. Specific Disclaimer/Disclosure acceptance required as applicable to the specific real estate system process)

Agent Referral Form

Language regarding Agent's agreement to transfer or refer a customer (i.e. Agent Disclaimer/Disclosure acceptance required with Brokerage Company signatures)

Contract Form to add listings, and process automated pre-populated contracts

Information relating to what information can be displayed to registered Agents and Sellers regarding hits on their individual listings Security disclaimer language (i.e. for credit card)

Chat disclaimer language

Electronic or Digital Signature and disclaimer (i.e. store a signature online for validation, or meet with client the initial time and store a copy of their signature on file by uploading a PDF hardcopy on file for them or use third party digital signature software for this capability. Each user will have a unique UserID, SignatureID, and InBoxID)

Real estate forms for online contract completion (i.e. auto-contract for different states and property types may be obtained from third party software providers and stored on-the web site).

Figure 14:
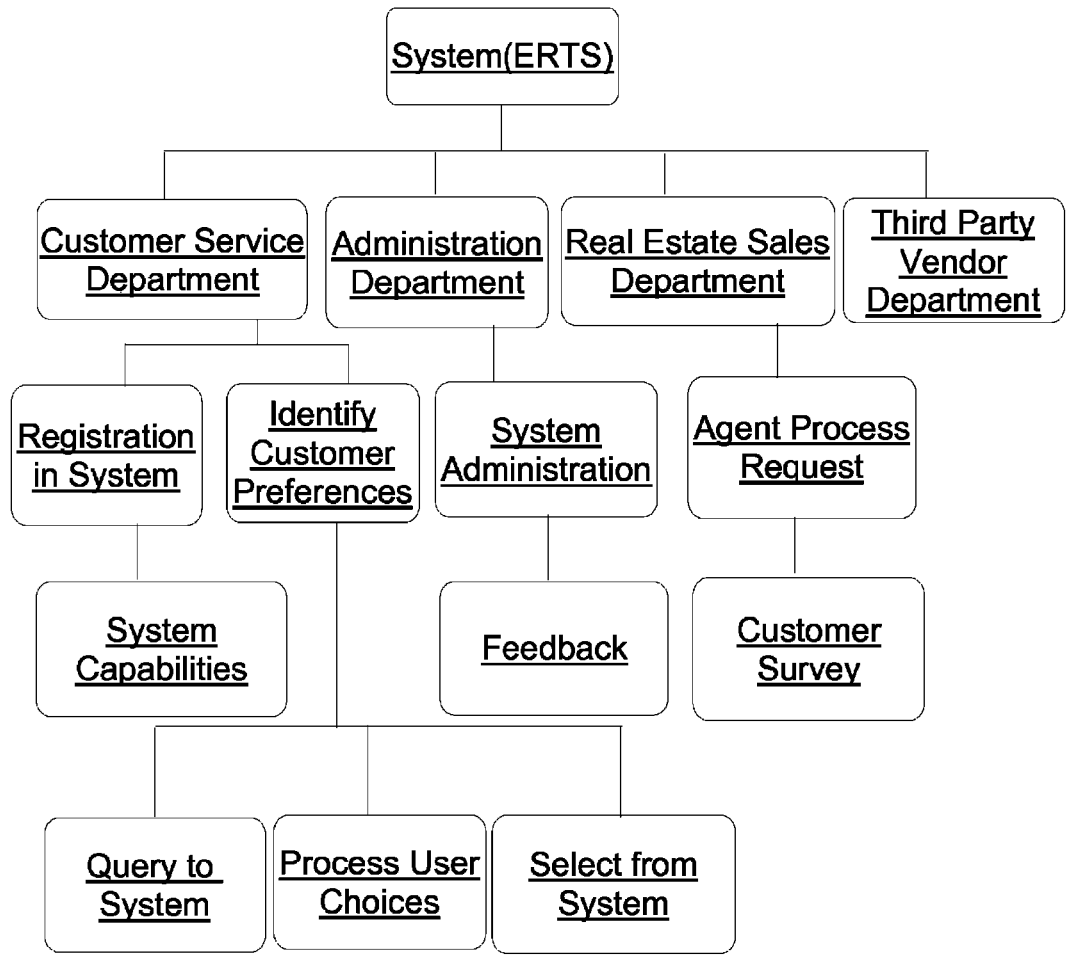
FIG. 14 depicts an exemplary overall functional decomposition diagram of the system.

Referring to FIG. 14, an exemplary overall functional decomposition diagram of ERTS is portrayed. FIG. 14 depicts at a high overview level various more or less departments including a customer (buyers, sellers, and realty agents) service department, and administrative function, real estate sales department, and third party function.

Figure 15:
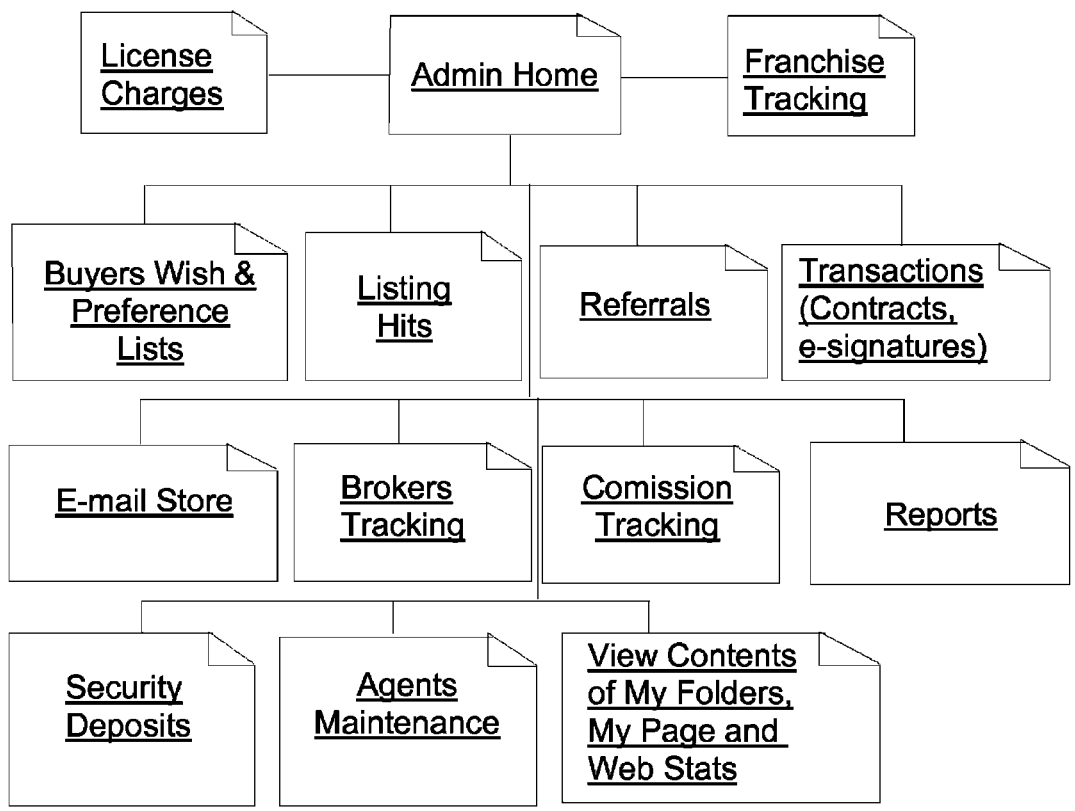
FIG. 15 depicts an exemplary administrative backend site map with the links or pages that are accessible by an administrator.

Referring to FIG. 15 an exemplary administrative backend site map shows the links or pages that are available to or accessible by an administrator with more or less extended privileges. This may be thought of as site map for the system backend and depicts various pages that are part of the system that are private or not accessible by the consuming public or customers.

Figure 16:
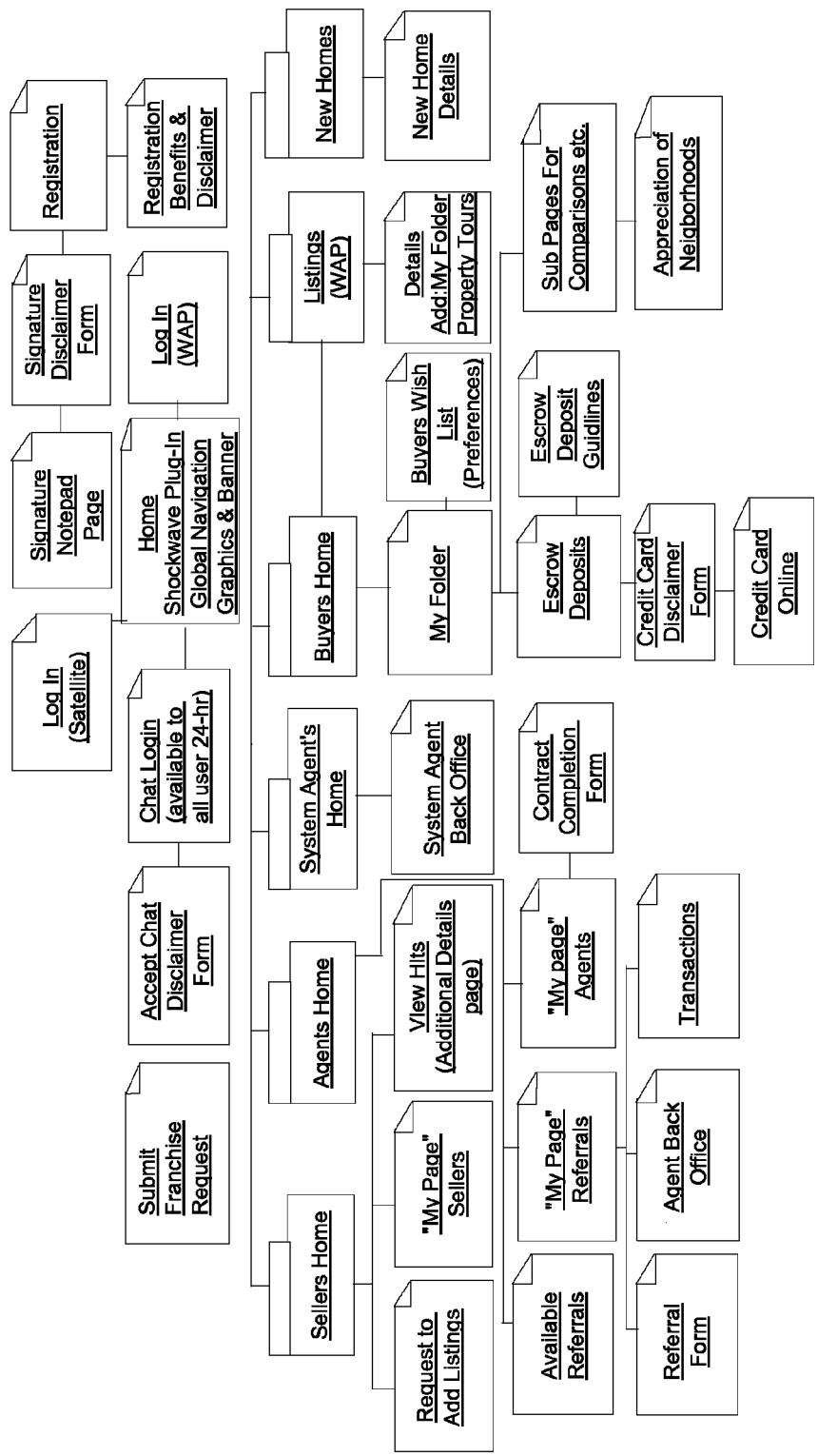
FIG. 16 depicts a high level and exemplary public front end or site map for the system from the consuming publics perspective.

Referring to FIG. 16, a high level and exemplary public front end or site map for the system from the consuming publics perspective is depicted. This is the public view of the ERTS although that view will vary according to the access privileges for a specific user or customer. For example a buyer, seller, and a listing or selling agent will have different views or be able to access different features, etc for this role-based system.

Figure 17:
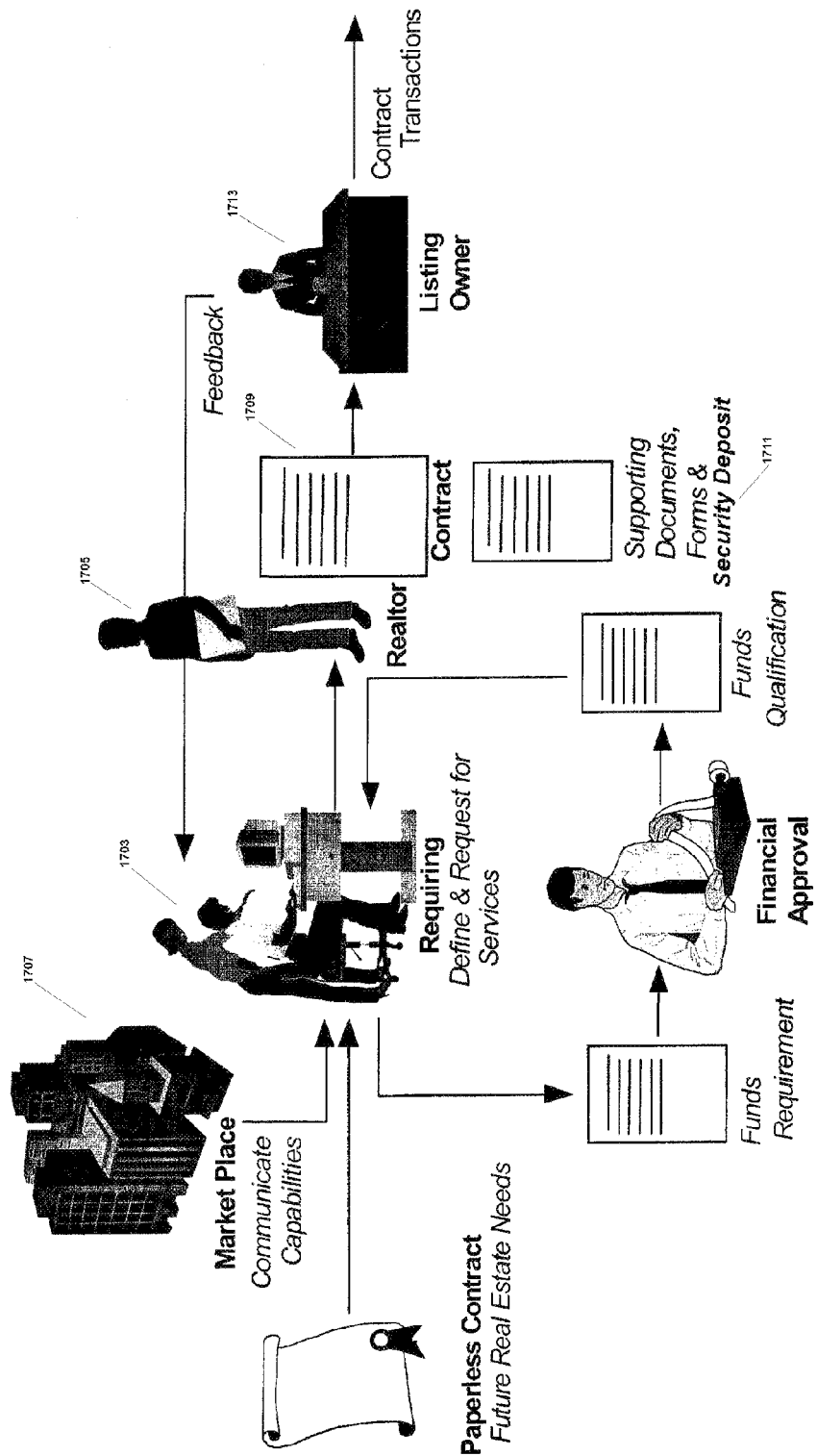
FIG. 17 depicts an exemplary environment for an electronic contract generator used within the system.

Referring now to FIG. 17, an electronic contract generator (ECG) that is utilized in ERTS according to one aspect of the present invention will be discussed. The ECG enables Realtors to collect, analyze and define high-level user needs and to acquire and develop information for generation of an Electronic Property Request (i.e. contract). It focuses on capabilities needed by Realtors and requirements for customers involved in developing property requests (contracts), and submitting the requests to the Listing Owner (Seller or Lessee). It also addresses the needs of Brokers who play key roles administering the contract.

The ECG will provide customers 1703 and Realtors 1705 throughout the marketplace 1707 with an electronic system that helps identify and complete necessary real estate transaction requirements. This will include the following functionality: making an offer and creating and pre-populating a property request (contract) 1709 using information from buyer, seller, and realty files and information entered in an online template form, reserving security funds, etc. 1711, notifying and routing the contract between concerned parties in order to facilitate and memorialize the negotiation process, and submitting the information to the relevant party such as back to the Seller (i.e. owner of the listing) 1713. The system is intended to support processing requirements for all property types and in U.S. dollars. It will support processing credit card transactions. It will also address the need for digital signatures that may play a key role in approving and providing a ratified contract.

The ECG will be accessible via the web, Internet, and the like wide area networks. This methodology targets and captures any residential, commercial and land property transactions more quickly, effectively and efficiently. The goal is to have the web site become the most popular "one-stop shop" for any real estate transaction (need or service) and further expand this capability to other Realtors and affiliated brokers to track and record the history of their property requests (contracts) and automate their day-to-day cumbersome activities.

The ECG is intended to meet the primary needs of people involved in requesting real estate services and developing and approving property requests (contracts). The individuals mainly involved with this phase of the real estate process include the following: Listing Agent, Selling Agent, Buyer, Seller, Loan Officer, Title Company, Credit Card Company, Listing and Selling Broker. A generic Third Party user may have access to view or comment.

The following parties may be involved in a typical real estate transaction in one or more of the manners noted below.

Listing Agent: Individual who may generate the listing contract. This person is a likely contract originator. He/she may have to obtain some approvals for the requirement before a property request (contract) is generated and sent to the Listing Owner (Seller).

Selling Agent: Individual who sells the real estate property and submits any further contract information to the ECG.

Buyer: Individual who generated or initiated the property request or selection. (Purchaser/Renter). In addition, this individual can make an security deposit, view or access the contract, make modifications or comments until settlement.

Seller: Individual who approves or disapproves the contract terms.

(Listing Owner) If approved, the Listing Owner (Seller) signs off on the contract. In addition, this individual can view or access the contract, make modifications or comments until settlement.

Credit Card Buyers Credit Card Company that may authorize the security

Company: deposit amount associated with the property. The Credit Card Company determines if funds are available, and verifies the credit card number and amount requested, which then can be electronically submitted to the ECG, or refunded back to the card if necessary.

Listing/Selling Individuals who assists the Listing/Selling Realtor and confirms Broker: commission requirements. Serves as commission collector once the property is sold or leased. He/she may also serve as customer support or may be a functional representative (i.e. supervisor) of the contract until closing.

Loan Officer: Individual who manages the mortgage and provides an approval letter on behalf of the Buyer for a property request (contract). This individual determines funds availability for the Buyer, and verifies the loan request, and can submit the loan approval information to the ECG. In addition, this individual can request additional information from the Buyer or purchaser if necessary, by making loan comments to the contract or in other areas, through the ECG.

Title Company: Individual who manages the contract for the Buyer and Seller. In addition, this individual can submit contract information and create or modify settlement terms and conditions for the contract, through the ECG.

Figure 18:
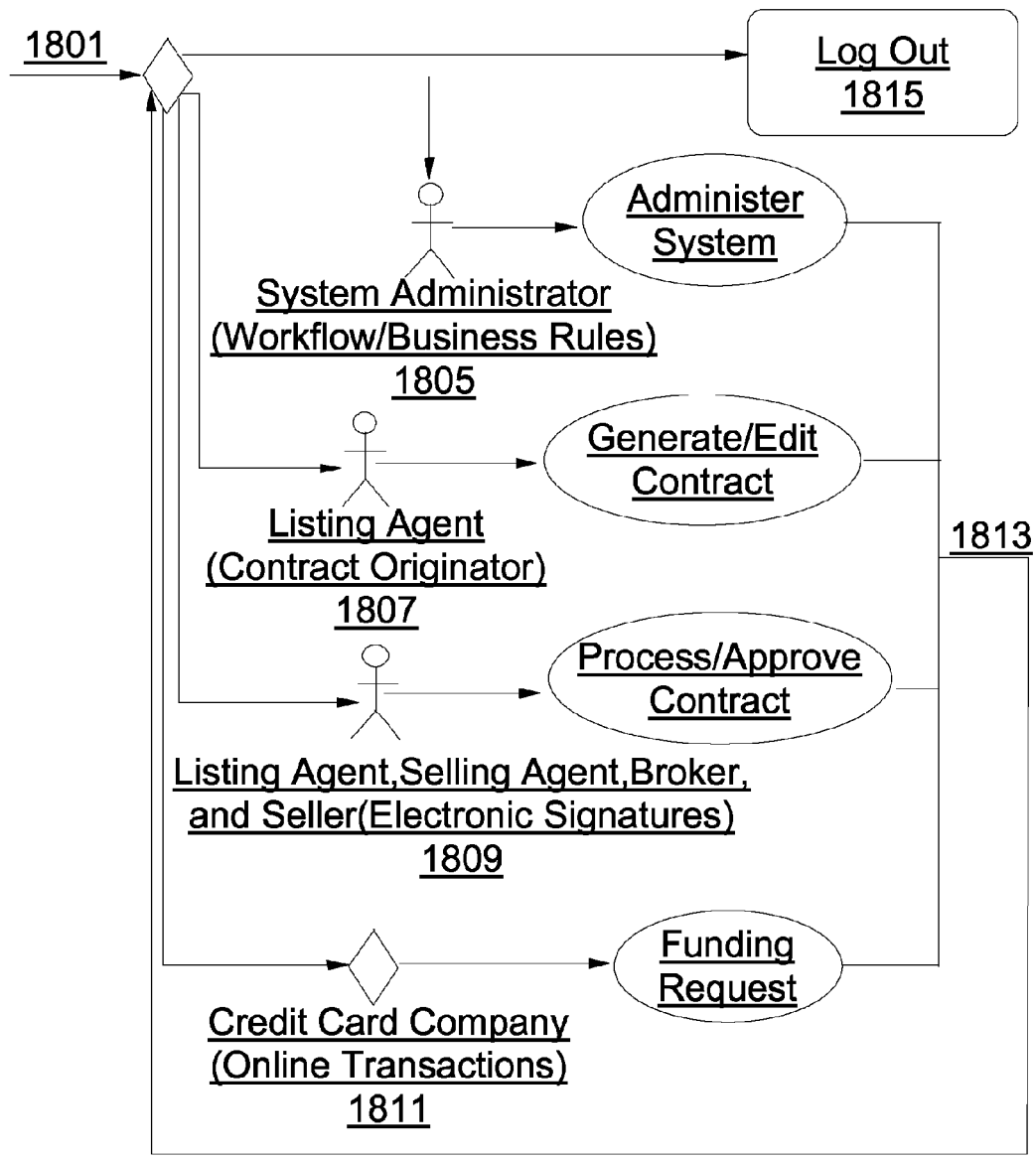
FIG. 18 depicts an exemplary high-level activity diagram for major system activities.

The Activity Diagram of FIG. 18 depicts user interactions that affect the flow of control between major system activities invoked by end-users. Each activity (a rounded rectangle) corresponds to one or more use cases (see Use case Diagram FIG. 23). This correspondence is not exhaustive, however as some of the Use Cases are not invoked by an end-user. Use Cases invoked by other Use Cases as a service or, invoked by time triggers are not depicted in this iteration of the FIG. 18 Activity Diagram.

FIG. 18 begins with the login activity 1801 and the possibilities for work choices based on the identified actor 1803 (i.e. System Administrator 1805, Listing Agent as the contract originator 1807, Listing Agent, Selling Agent, Buyer, Seller for the digital signatures 1809, Loan Officer, Credit Card Company 1811, Title Company or Generic Third Party {not specifically shown}). See the Use Case Diagram for detailed accessibility of each of these system actors. As indicated, after work in the various processes 1813, the user is allowed to loop to the beginning or log out 1815 of the system.

Figure 19:
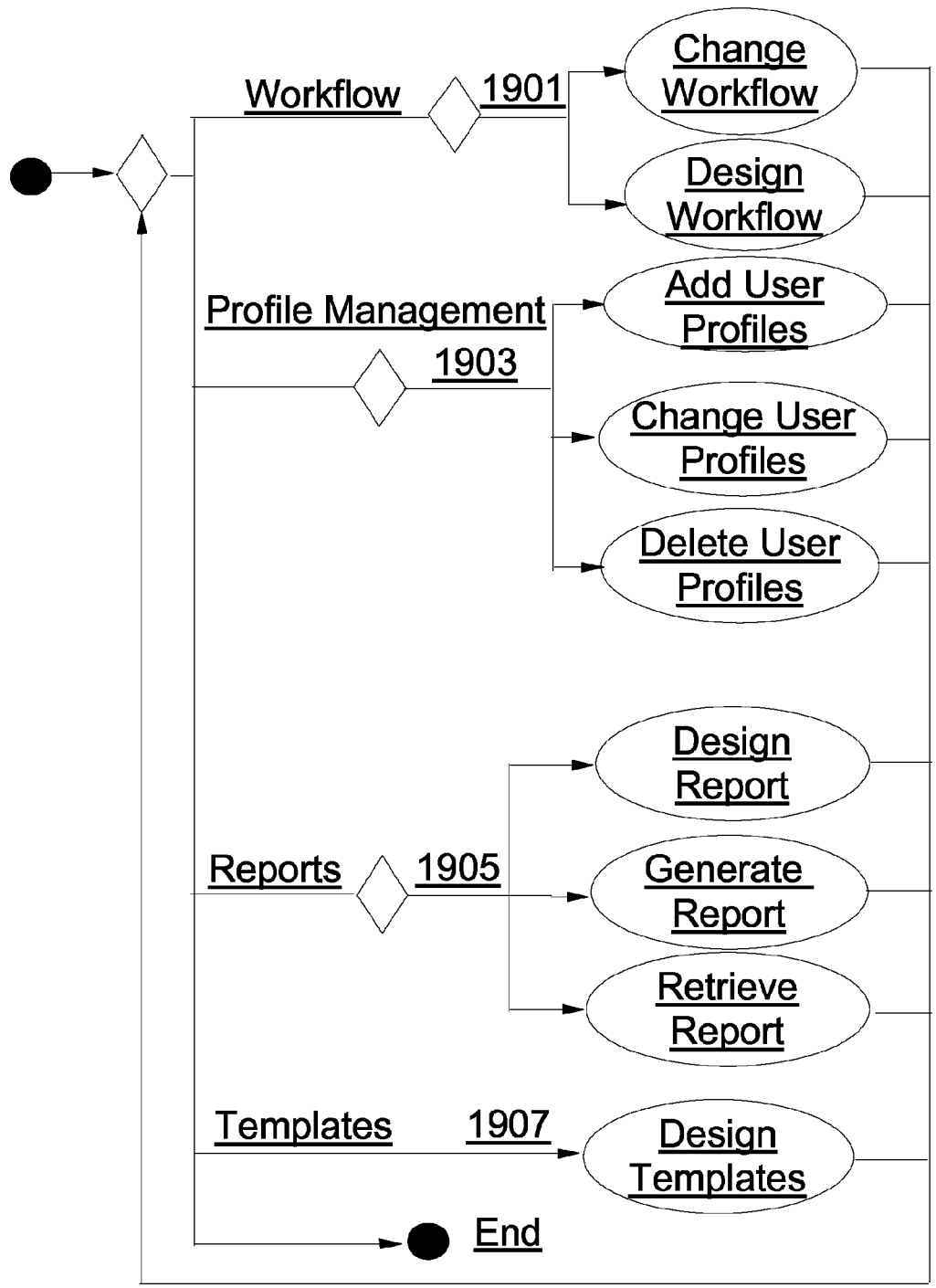
FIG. 19 depicts an activity diagram for various administrative actions.

FIG. 19 depicts the actionable processes involved in managing workflows 1901 and maintaining users 1903 on the system. System administrators tailor the system to accommodate the business rules, add, change, or delete users, generate reports 1905 and supporting document templates 1907 as appropriate.

Figure 20:
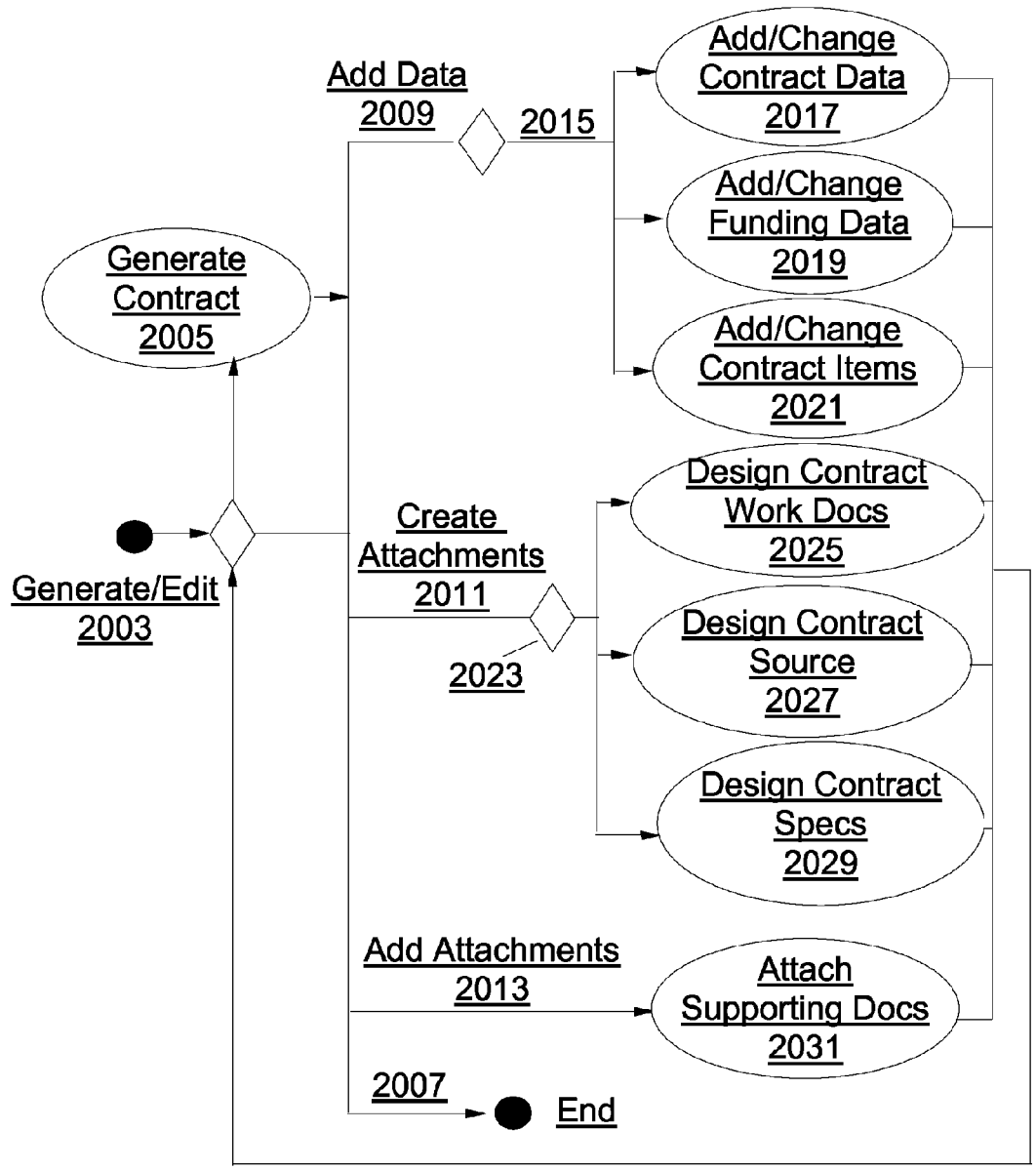
FIG. 20 depicts an activity diagram for various processes undertaken by the electronic contract generator.

FIG. 20 depicts various actionable processes involved in generating and modifying a contract and shows some of the primary functionality of the Electronic Contract Generator (ECG). The Activity begins and determines whether a contract should be generated or edited at 2003 and if generated then 2005 is devoted to generation of a contract. After 2003 or 2005 the process may end 2007 or the contract, whether newly created or pre existing may be edited, by adding or changing data 2009, creating attachments 2011, or adding other supporting attachments 2013. If data is added 2015 determines whether to add or change contract data 2017, add or change funding data or add or change contract items and after the selected action, the flow returns to 2003. If attachments, such as addendum's or additional required contractual forms based on property contract type or property attributes, are to be created, 2023 determines whether to design contract work documents 2025, design contract sources 2027, or design contract specification 2029 and after the selected action, the flow returns to 2003. If attachments are to be added the supporting documents are added or attached to the contract at 2031 and the flow returns to 2003. Various Templates will allow the user to attach supporting documents to the contract or contract package.

Figure 21:
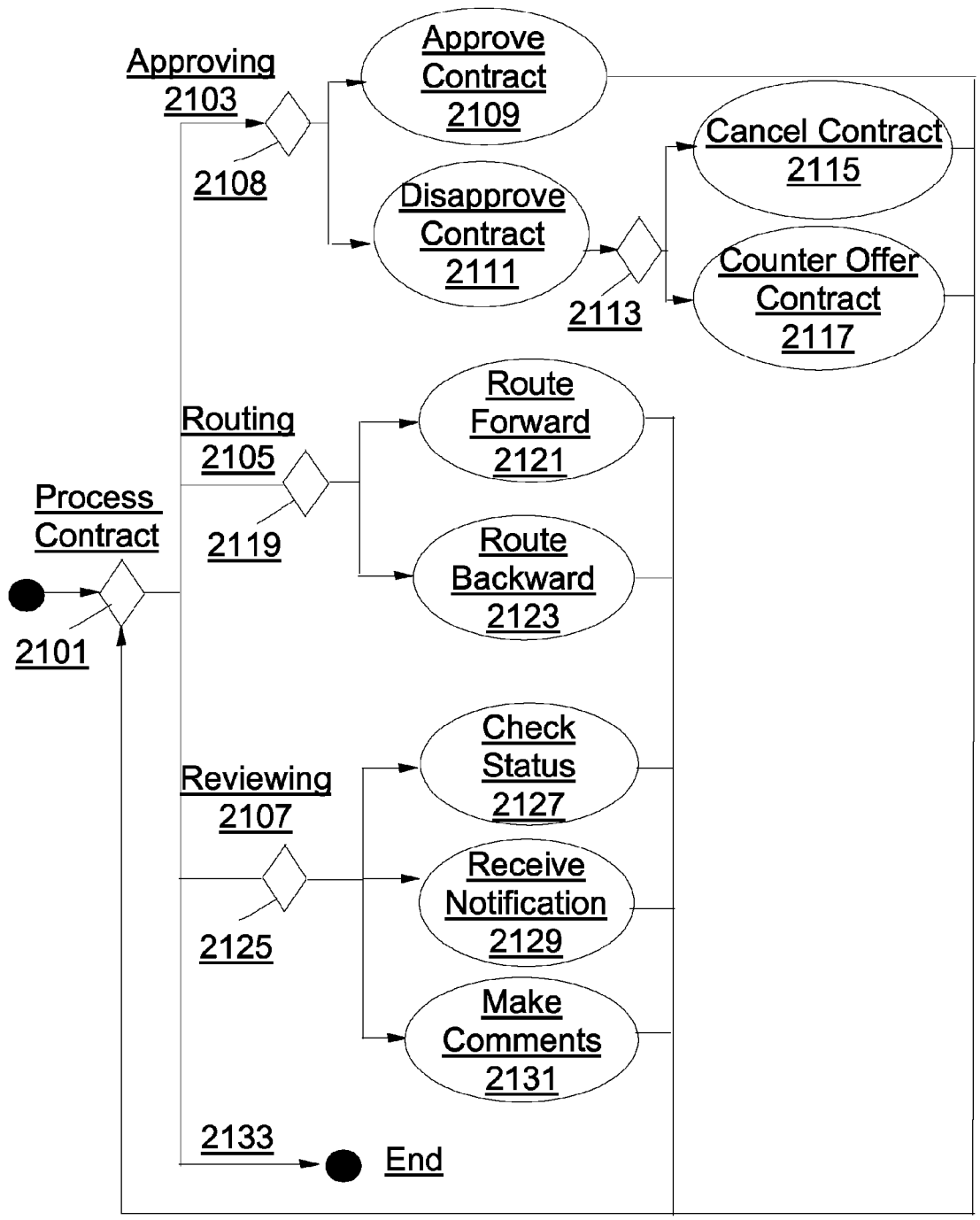
FIG. 21 depicts another activity diagram for other processes undertaken by the electronic contract generator.

Referring to FIG. 21, the actionable processes involved in processing the contract, such as approving, disapproving, counter offering, canceling and routing the contract through a workflow will be discussed. The workflow may be pre-defined by the system administrator or may be created on the fly (ad-hoc). Users or relevant actors may also make comments and view the status of the contract at any point in the workflow. Digital signatures may be incorporated or documents will be scanned in and uploaded if signatures have to be manually obtained. The contract processing activity diagram begins and at 2101 it is determined whether an approval 2103, a routing 2105, or review 2107 action is desired. If an approval path is followed, 2108 determines whether the contract will be approved 2109 or disapproved 2111. If disapproved 2113 determines whether the contract will be withdrawn or canceled 2115 or whether a counter offer will be made 2117. After approval or cancellation or counter offer the flow returns to 2101.

If the routing path is followed 2119 determines whether to route forward 2121 or backward 2123 and after the selected action the flow returns to 2101. If the reviewing path is chosen 2125 determines whether the status is checked 2127, a notification is received 2129, or comments are to be made 2131 and after the selected action the flow returns to 2101. One other path that may be taken from 2101 is to end the contract processing activities at 2133.

Figure 22:
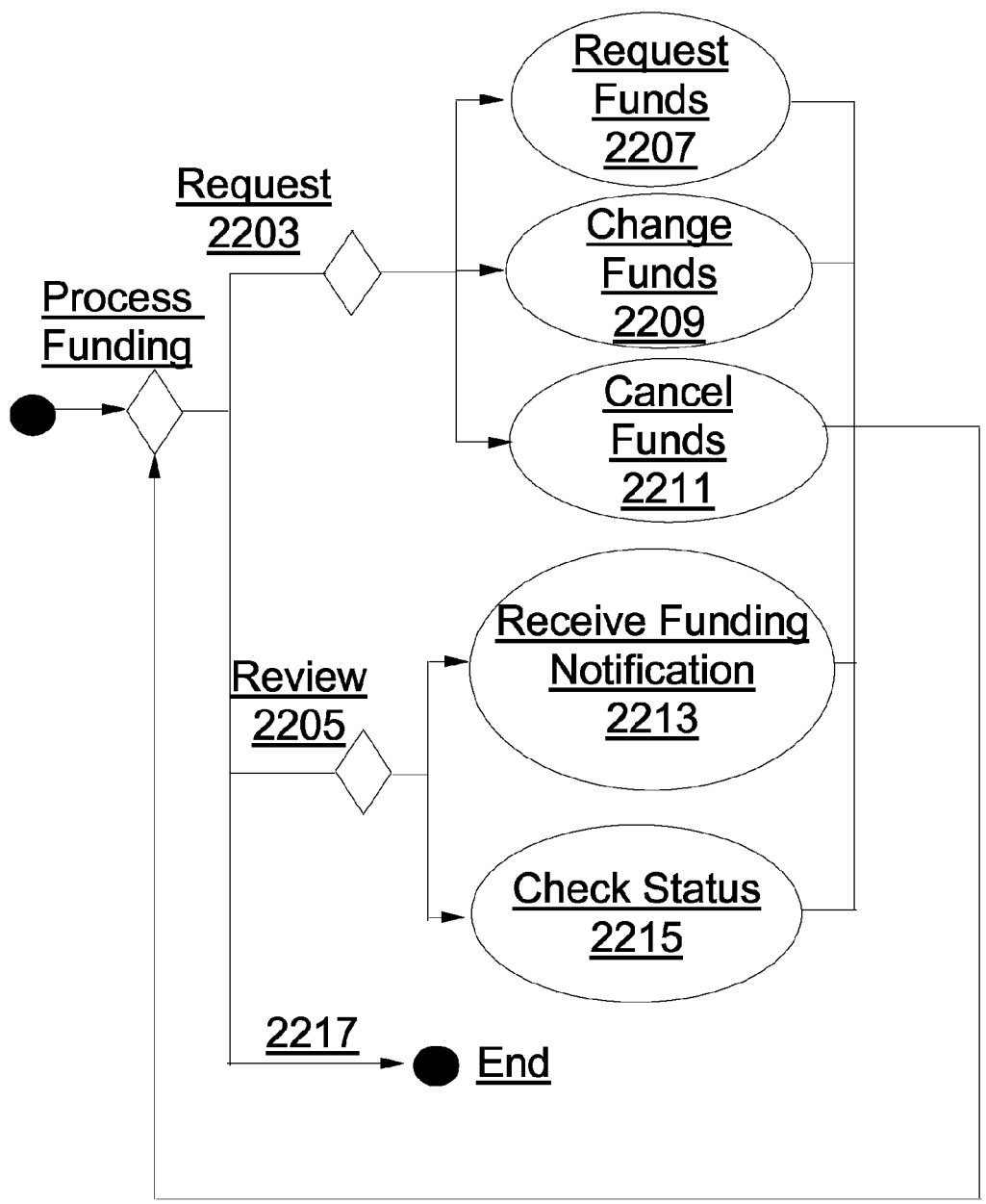
FIG. 22 depicts an activity diagram for funding activities of the electronic contract generator.

Referring to FIG. 22 various actionable processes involved in obtaining funding, such as online credit card transactions for a contract and verifying funds will be discussed. Associated activities are editing and approving the amount for the contract, which is addressed by the above discussed activity diagram. The activities depicted by FIG. 22 include requesting funds 2203 and reviewing funding status 2205. The requesting activity may be either an initial request for funding 2207, a change in a request 2209, or a cancellation of a funding activity 2211. The reviewing activity includes either receiving a notification related to funding 2213 or otherwise checking status of the funding 2215. All paths lead back to the start and from there to the end of the processes 2217.

Figure 23:
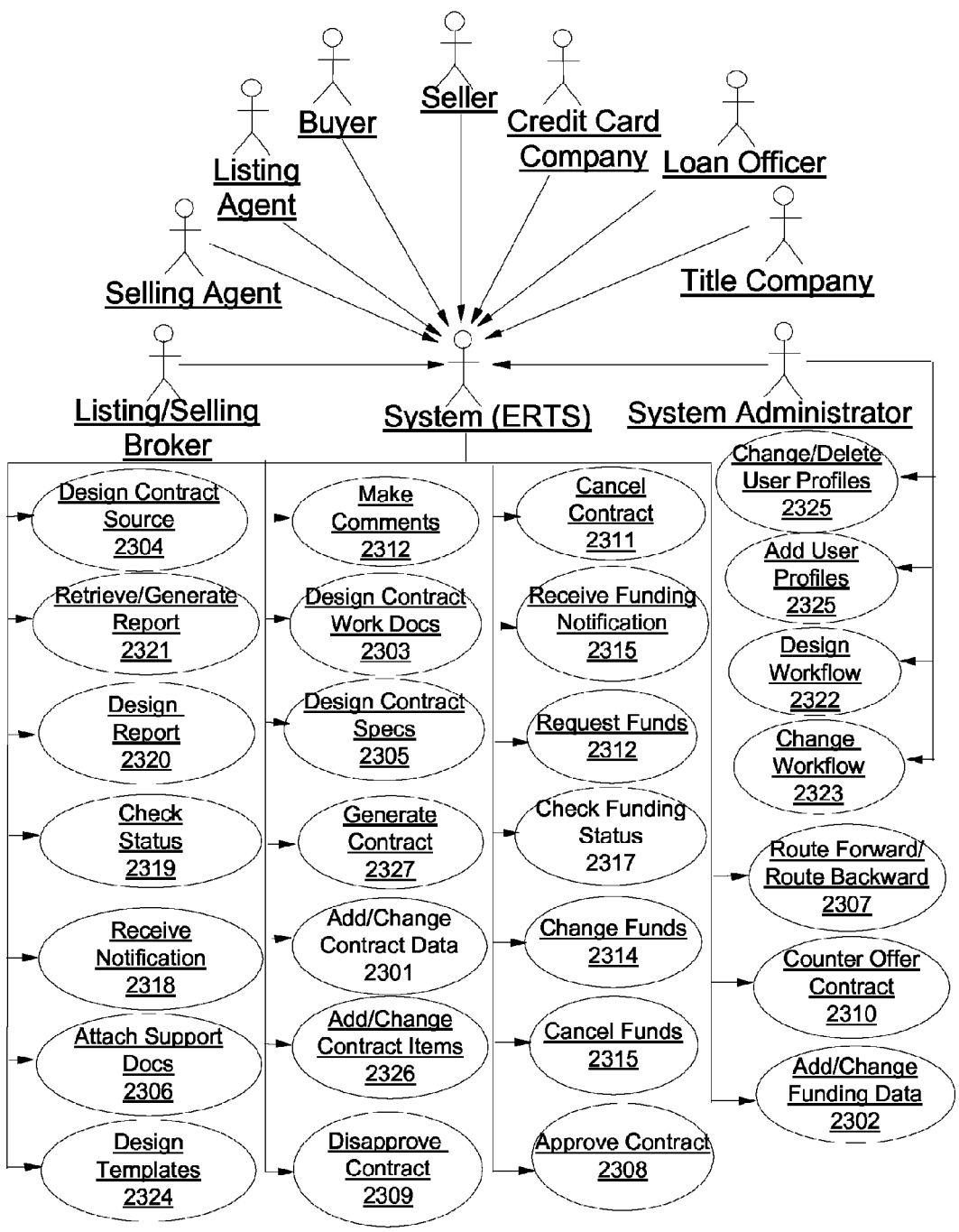
FIG. 23 depicts a use case model for the electronic contract generator.

Referring to FIG. 23, a Use Case Model is used to identify key actors within the ERTS and more specifically the Electronic Contract Generator (ECG) portion of the system and the primary sets of actions or use cases that the actors perform in the course of their work. This use case model effectively identifies the many end-users of the Electronic Contract Generator (ECG) and their specific needs within the system. The stick figures identify actors with the use case model while the ovals summarize actions with the ERTS and specifically ECG portion of the system. The lines between actors and actors, such as the system and the ovals determine interactions of the system with the use cases. The specific use case or ovals will now be described in more detail.

Add/Change Contract Data:

This use case begins when changes or additions need to be made to specific contract data portions of property request (contract). This includes initial data entry for the purpose of creating the property request (contact) and adding or changing information previously entered. The use case ends once the new information is saved to the property request (contract). The 1-click-edit concept is applicable when changing individual areas of a property request (contract). The 1-click edit procedure facilitates changing a single field or small number of fields for previously stored data and the system only updates the field or area changed on the form, such as a contract document. Data is efficiently updated into the database as opposed to resaving the entire form and all counterparts. This method overrides and marks an efficient process as opposed to a time consuming process which uses more system resources for resaving unchanged data to the database.

Add/Change Contract Items: 2301

This use case begins when contract items need to be added or changed on a property request (contract). The user selects the appropriate contract item to add or replace existing information, as needed utilizing the 1-click edit concept. The use case ends when the necessary contract item changes or additions are saved to property request (contract).

Add/Change Funding Data: 2302

This use case begins when changes or additions need to be made to the funding data portion of the property request (contract). The user adds or changes the appropriate funding data to the property request (contract) including sales price, down payment, first trust, second trust amounts, etc. The use case ends once the funding changes or additions have been saved to the property request (contract) as needed utilizing the 1-click edit concept.

Design Contract Work Documents: 2303

This use case begins when documentation describing property request (contract) details are required to complete the property request (contract). The user obtains the supporting documents from the party responsible for performing the work or creates it in a text document, or by modifying a template. The use case ends when a supporting document for the property request (contract) is documented and is ready to be attached to the property request (contract).

Design Contract Source/Justification/Disclaimer: 2304

This use case begins when a user determines that an agent in particular is needed to satisfy and represent their real estate needs. This user, justifies/disclaims this recommendation in writing by creating a text document or by modifying a template, that can be added to the contract. The use case ends once the justification/disclaimer is documented and is ready to be attached to the contract. Electronic or digital signatures shall be incorporated as an option.

Design Contract Specifications: 2305

This use case begins with a need to describe detailed physical, functional, or technical specifications of the property to be sold or rented. The user may import a document from an external source or design the specifications using a pre-existing template, (i.e. copy an existing contract). The use case ends once the user has documented the specifications of the property and is ready to attach the document to the property request (contract).

Attach Supporting Documents: 2306

This use case begins once additional justifications/disclaimers or specifications are documented that are required to support the property request (contract). The user adds the supporting documentation from modified templates or imports documents from other external sources. The use case ends when the supporting documents have been attached to the property request (contract).

Route Forward: 2307

This use case begins when actions on a property request (contract) are saved and complete and it needs to be routed forward in a workflow. The user routes the property request (contract) forward for additional approval or for action. The use case ends once the next user in the workflow receives the property request (contract). The property request (contract) will have specific time limitations assigned to each workflow recipient. If the recipient in the workflow does not review or accept the property request (contract) in a given time period, the system may route the contract to the next recipient in the workflow or mark the contract as cancelled.

Route Backward: 2307

This use case begins when actions on a property request (contract) are saved and it needs to be routed backward in the workflow. The user sends the property request (contract) back for additional information or for changes. The use case ends once the intended user receives the property request (contract).

Approve Contract: (Accept/Ratify) 2308

This use case begins when a property request (contract) has been routed for approval and is received by a Seller, Buyer, Renter, or Rentee. The user approves the property request (contract) with or without comments. The use case ends when the property request (contract) is routed to the next user for action.

Disapprove Contract: (Reject) 2309

This use case begins when a property request (contract) has been routed for approval and is received by a Seller, Buyer, Renter, or Rentee. The user can disapprove the property request (contract), with or without comment and send the property request (contract) back to the Realtor or Broker. The use case ends when the property request (contract) is routed to the next user for action.

Counter Offer Contract: (Return for Action) 2310

This use case begins when a property request (contract) has been routed for approval and is received by a Seller, Buyer, Renter, or Rentee. The user determines if additional action is required before the property request (contract) can be approved. The use case ends when the Realtor or Broker receives the property request (contract).

Cancel Contract: 2311

This use case begins when a property request (contract) has been submitted for approval. At the discretion of the creator of the property request (contract), this use case ends when this individual cancels the property request (contract). The system can also cancel a contract based on programmed time mechanisms that each contract is tracked by, (i.e. see route forward 2307).

Make Comments: 2312

This use case begins when a user determines additional comments are necessary to process the property request (contract). The user adds text comments to the property request (contract) before routing it to the next user. The use case ends when the user makes and saves the comments.

Request Funds/Submit Funding Request: 2313 (Credit Card Information)

This use case begins when an authorization is needed for a funding request. The funding request is routed to a Credit Card Company to obtain a credit card validation. The financial authority verifies all funding information for accuracy and sends an approval request for funding to the system. The use case ends when the system receives the funding approval for a property request (contract).

Change Funds/Submit Funding Change: 2314 (Credit Card Information)

This use case begins when a funding request needs to be changed. The funding request change is routed to the Credit Card Company to obtain another credit card validation or refund. The financial authority verifies all funding information for accuracy and sends an approval or refund request for the funding change to the system. The use case ends when the system receives a debit or credit for the property request (contract) or the use case ends when a funding change is submitted to rectify any errors or cancellations.

Receive Funding Notification: 2315

This use case begins when a request has been sent for funds such as credit card funds. The system posts confirmation of the commitment or change to the system, which can be viewed by the user. The use case ends when the user views or gets receipt of the credit card funding notification.

Cancel Funds/Cancel Funding Request: 2316

This use case begins following cancellation of the property request (contract). The financial authority submits a funding cancellation to the system to stop reservation of funds for a property request (contract). The use case ends when the request for cancellation is received in the system.

Check Funding Status: 2317

This use case begins following request, cancellation or change of the funding request. The financial authority submits a funding notification to the system of the new reservation of funds for a property request (contract). The use case ends when the request is received in the system and stored with the previous one.

Receive Notification: 2318

This use case begins when the system records action taken on a property request (contract). The user should receive automatic notification in some form without having to prompt the system. The use case ends once a user receives notification of action taken on a property request (contract).

Check Status: 2319

This use case begins when a user wants to know the status of a particular property request (contract). The user queries the system for status information including approvals, changes, comments, etc. The use case ends once user queries the system and receives status information back about the property request (contract).

Design Report: 2320

There are no pre-conditions for this use case. The user specifies the types of data needed and determines the layout of the report to be created. The use case ends once these requirements have been determined and the report is generated.

Retrieve Report: 2321

This use case begins when system-generated information is requested to trace a property requests (contracts) activity history and/or to obtain information of its content. The user queries the system using a pre-designed report or based on data queries. This use case ends when a report containing this information is generated for a user to view.

Generate Report: 2321

This use case begins when a user requests audit information concerning a property request (contract). The user may query the system for specific data to be included within the property request (contract). Once a report is generated and printed this use case ends.

Design Workflow: 2322

There is no precondition for this use case. The administrator designs the workflow for the property request (contract) based on business rules. The use case ends once the workflow has been defined.

Change Workflow: 2323

This use case begins when the current workflow does not satisfy the current routing needs. Authorized Users or system administrators make changes to steps within the approval chain. The use case ends once the workflow has been modified to reflect the changes.

Design Templates: 2324

This use case begins with a need to customize and design templates to allow flexibility in the design of attachments and documents. System administrators create the templates for generating commonly used supporting documents. The use case ends when templates are created and made available on the system.

Add/Change/Delete User Profiles: 2325

This use case begins when changes or additions need to be made to users on the system. These profiles include access, sign-on and other security considerations, in addition to approving and viewing privileges. The use case ends once the system administrator has made all necessary changes and additions to the system user profiles.

Add Contract Items: 2326

This use case begins when certain contract forms or addendum's need to be with contained with the property request (contract). The Realtor adds the appropriate form or addendum to the property request (contract). The use case ends once the additions have been saved with the property request (contract).

From a functionality or feature perspective the ECG in addition to fulfilling the above noted Use Cases further satisfies numerous requirements. Various of these features are noted below in a tabularized format grouped as identified from time to time.

Generating Property Requests (Contracts): 2327

PRD1 The ECG supports generating a property request (contract).

PRD1.1 The ECG supports access to databases of exiting purchase requests (contracts).
PRD1.2 The ECG supports access to databases of pre-existing forms (i.e., Residential, Commercial, Land, etc.)
PRD1.3 The ECG supports creating anew property request (contract) based on a previous one. (i.e. copying)
PRD1.4 The ECG supports access to web-based links for information:
PRD1.5 The ECG supports access to locally or externally hosted electronic databases.
PRD1.6 The ECG supports access to mandatory real estate forms including:
Addendums
Disclaimers
Disclosures
PRD1.7 The ECG supports entering the following property request (contract) form information as applicable: (i.e. listing agreement, sales contract, addendum, disclaimer, disclosure, etc.)
Date
Seller/Buyer
Listing/Selling Broker and Listing/Selling Agent
Property Description
Items to Convey
Expiration Date
Seller Signatures
Buyer Signatures
Listing Agent Signatures
Selling Agent Signatures
Broker Signatures
Compensation Days after Expiration or Termination
Retainer Fee
Sub Agency Compensation
Buyer Agency Compensation
Check Box Terms
Sale or Rent Price
Property Disclaimers (i.e. Residential, etc.)
Disclosures and Acknowledgement of Information (i.e. Lead-Based Paint Hazards, etc.)
Disclosure of the Use of Designated Representatives or Disclosure of Dual Representation
Contract PRD1.7.7/Amendment Number
MLS/MRIS Number
The ECG PRD1.8 Supports entering the following contract item information:
Other Terms, Conditions or Contingencies
PRD1.9 The ECG supports entering the following account data:
Credit Card Information
Credit Card Type
Account Number
Expiration Date
Account Holder
4-Digit Code (if applicable)
PRD1.10 The ECG automatically generates unique document numbers and revision numbers and support manual override. (MLS/MRIS will be a field that will pre-populate once the contract is generated from a listing)
PRD1.11 The ECG automatically calculates funding totals and supports manual override.
PRD1.12 The ECG allows adding free-form text comments to the property request (contract) in specified areas.
PRD1.13 The ECG supports free-form text for contract item descriptions.
PRD1.14 The ECG provides tailorable pull-down lists or pick lists.
PRD1.15 The ECG supports multiple lines for funding items or information, (i.e. money comes from different sources).
PRD1.16 the ECG supports U.S. Dollars, preferably, rather than non-USA currency.
PRD1.17 The ECG allows clipboard capability.
PRD1.18 The ECG supports attachment of supporting documents.
PRD1.18.1 The ECG supports customizable templates for supporting documents (contract work documents, specifications, contract source justification, disclaimers, etc.)
PRD1.18:2 The ECG supports attachment of any type of electronic document or file to a property request (contract) as supporting documents and classifies type of attachment.
PRD1.18.3 The ECG supports inclusion of legal text, such as Terms and Conditions, as an attachment.
PRD1.18.4 The ECG allows for the removal of attachments based on privileges.
PRD1.18.5 The ECG allows for editing attachments within their host application.
PRD1.18.6 The ECG bundles supporting documents with the property request (contract) into a single package (bundle) and then routes them together.
Data Validation Features
PRD2 The ECG provides data validation and error handling.
PRD3 The ECG checks against credit card items (valid account information).
PRD4 The ECG automatically checks and prompts for mandatory approvals for forms such as Residential Property Disclaimer Statement, or other necessary forms as applicable.
PRD5 The ECG automatically checks for duplicate property requests (contracts) or amendment numbers. PRD6 The ECG a-
PRD7 The ECG automatically populates fields based on the user profile.
Tracks Workflow Features
PRD8 The ECG supports routing the property request (contract) through a defined and tracked workflow.
PRD8.1 The tracked workflow supports both approval member and information member privileges.
PRD8.2 The ECG supports ad-hoc routing by authorized users and system administrators.
PRD8.3 The ECG supports sequential routing.
PRD8.4 The ECG supports parallel routing.
PRD8.5 The tracked workflow supports multiple approval members.
PRD8.6 Each approval member shall be able to approve, disapprove, return for action, and add comments to a property request (contract).
PRD8.7 The ECG supports freezing and canceling property request (contracts) by the user, based on privileges.
PRD8.8 The ECG provides the ability to work on multiple property requests (contracts) at a time.
PRD8.9 The ECG supports multiple user access at the same time.
Querying, Reporting and Printing
PRD9 The ECG tracks documentation history.
PRD9.1 The ECG records the routing of the property request (contract) through the workflow.
PRD9.2 The ECG records changes made to the property request (contract).
PRD9.3 The ECG records comments made to property request (contract).
PRD10 The ECG informs users when actions are taken on a property request (contract).
PRD11 The ECG notifies users when an action is required.

PRD12 The ECG supports viewing a property request (contract) status at any point in the workflow, (i.e. routing history).
PRD13 The ECG supports customizing reports based on any data element.
PRD14 The ECG supports database queries, (i.e. searching).
PRD14.1 The ECG supports organizing/sorting by state, property type, property addresses, dates, and contract status.
PRD14.2 The ECG supports filtering by dollar amount, property type, and text.
PRD15 The ECG supports document retrieval.
PRD15.1 The ECG allows for document retrieval by Broker code.
The ECG allows for document retrieval by Agent Number.
PRD15.2 The ECG supports document retrieval by property request (contract) number or amendment number, and MLS.
The ECG supports document retrieval by property address
The ECG supports document retrieval by property address and state PRD15.1
PRD16 The ECG prints various real estate standard forms including:
PRD16.1 The ECG Listing Contracts, Regional Sales Contracts, etc.
Interface features
PRD17 The ECG may interface with other systems.
PRD17.2 The ECG may support submitting a funding request.
The ECG may support receiving and posting confirmation of funds commitment.
The ECG supports submitting modifications to a contract with a funding request.
The ECG supports receiving and posting confirmation of funding requests modifications.
The ECG supports submitting funding request cancellations.
The ECG supports receiving and posting confirmation of funds cancellation.
The ECG prints commitment documents for distribution to another agency.
PRD18 The ECG operates independently of MLS.
PRD17 The ECG may interface with Credit Card Companies.
PRD17.2 The ECG interfaces with multiple Credit Card servers.
The ECG supports submitting a funding request to Credit Card Companies.
The ECG supports receiving and posting confirmation of a contract funding requests.
The ECG supports submitting changes to a Credit Card Company.
The ECG supports submitting Credit Card cancellations.
The ECG supports receiving and posting confirmation of Credit Card cancellations.
The ECG receives account status information from Credit Card Companies.
The ECG reads Credit Card Company reference data.
PRD18 The ECG shall operate independently of Credit Card Companies, (i.e. use personal checks).
PRD17 The ECG supports integration of digital signatures.
PRD17.2 The ECG supports integration with electronic systems (satellite, WAP/WML, PDA, etc).
PRD18 The ECG operates independently of electronic providers or systems.
Administration
PRD22 The ECG provides workflow management and administration capability.
PRD22.1 Workflow administrators will be able to create a hierarchical workflow.
PRD22.2 Workflow administrators will be able to create and modify user profiles.
PRD22.3 The workflow will be role-based, name-based and account based.
PRD22.4 The ECG supports automatically rerouting to the next approver based on a manual setting (i.e. approval authority will be out of the office for extended period of time).
PRD22.5 The ECG supports automatically rerouting to the next approver based on a time threshold setting (i.e. approval authority takes action too slowly or just does not respond).
PRD23 The ECG provides online help, including user-defined help files. The help feature is a menu bar function, and screen sensitive.
PRD24 The ECG provides access control and security using UserID and an encrypted Password.
Client System Requirements
PRD25 The ECG provides a Graphical User Interface.
PRD26 The ECG supports TCP/IP, HTTP, and https to provide Internet/Intranet access.
PRD27 The ECG is OBI compliant.
PRD28 The ECG consists of web-based, preferably multi-tier business logic, server architecture.
PRD29 The ECG requires a browser-based, thin client.
PRD30 The ECG supports Microsoft's Internet Explorer 4.0 or higher and Netscape's Communicator/Navigator 4.0 or higher.
Application Integration and Data Transfer
PRD31 ECG documentation provides a database schema.
PRD32 ECG documentation provides a data dictionary.
PRD33 ECG provides a facility for importing data into a data warehouse, via a parcer.
PRD34 ECG supports the Simplified Message Transfer Protocol (SMTP).
PRD35 ECG supports selection of tables and data elements for export to any of 12 standard data formats (Excel, TXT, CSV, SQL Syntax, SYLK, WKS, WKI, WMF, DIF, DBF2, DBF3, and Report).
PRD36 ECG supports electronic data exchange using EDI, ftp, any protocols and email.
PRD38 The ECG supports OBI compliance
PRD39 The system uses an SQL compliant database.
PRD40 The ECG supports JDBC connectivity.
The ECG uses and supports real-time Chat capability.
Infrastructure
PRD41 The ECG complies with Real Estate Standards.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method comprising:
providing a plurality of real estate listings of real estate properties to a user;
receiving a selection from the user of a real estate listings of a particular real estate property;
identifying parties and agents involved with a real estate contract for the selected listing;
collecting and storing, online and in electronic form, transaction specific information for a real estate contract for one of the selected real estate listings, the transaction specific information including identities of parties and agents involved with the real estate transaction and a contract price for the real estate transaction;
providing, in an electronic format, a real estate contract form;
automatically populating, in a computer, the real estate contract form with at least some of the transaction specific information for the selected real estate listing;
automatically generating online, in the computer, responsive to populating the real estate contract form, an electronic file corresponding to the real estate contract for the real estate transaction for the selected real estate listing;
sending a notice of the generated electronic file corresponding to the real estate contract to parties and agents in a workflow for the real estate transaction;
receiving a change of the electronic file corresponding to the real estate contract from one of the parties or agents involved with the real estate transaction;
in response to receiving the change, changing a portion of the transaction specific information in the electronic file corresponding to the real estate contract;
wherein only read access to the electronic file corresponding to the real estate contract is granted to at least some parties and/or agents in the workflow, and wherein read/write access to the electronic file corresponding to the real estate contract is granted to a buyer and a seller involved in the real estate transaction.

2. The method of claim 1 wherein the collecting, in electronic form, transaction specific information for a real estate contract further comprises obtaining some transaction specific information from a contract information file.

3. The method of claim 1 wherein:
the providing, in an electronic format, a real estate contract form further comprises providing a standard real estate contract form that is un-populated with tagged fields in a portable document format (pdf) file format;
the populating of the real estate contract form with the transaction specific information further comprises populating the tagged fields of the standard real estate contract form in the pdf format from corresponding data base fields; and
the generating online, responsive to populating the real estate contract form, an electronic file corresponding to the real estate contract for the real estate transaction further comprises generating a populated real estate contract in the pdf format.

4. The method of claim 1 further comprising:
tracking any change(s) to the transaction specific information in the real estate contract and a history of the change(s) including a party or agent that originated the change, a status of a party or agent, and a time of the change(s); and
sending a notice of any changes to the parties and agents involved with the real estate transaction.

5. The method of claim 1 further comprising:
identifying at least one addendum or disclaimer to associate with the real estate contract; and responsive to receiving the change of the real estate contract, automatically creating online additional electronic files corresponding to the selected listing and the at least one addendum or disclaimer to associate with the real estate contract.

6. The method of claim 1, wherein the identifying includes obtaining information on at least one of the parties from an online registration of the at least one of the parties.

7. The method of claim 1, further comprising:
receiving a selection from a user of a language in which to present the real estate contract, the language being selected from a plurality of languages; and
presenting the real estate contract to the user in the selected language.

8. The method of claim 1, further comprising: displaying a virtual tour of the particular real estate property.

9. The method of claim 1, further comprising:
receiving an electronic document from a user; and
associating the electronic document with the electronic file corresponding to the real estate contract.

10. The method of claim 1, further comprising changing a field of previously populated transaction specific information in the form through a 1-click edit procedure to update the information in the field.

11. The method of claim 1, further comprising:
generating a price appreciation report for the particular real estate property; and
presenting the price appreciation report to the user.

12. The method of claim 11, further comprising:
generating a price appreciation report for a neighborhood; and
presenting a graphical trend analysis of the price appreciation of the particular property and of the neighborhood to the user.

13. The method of claim 1, further comprising:
receiving a selection from the user of a plurality of real estate listings of particular real estate properties; and
ranking the plurality of listings by at least one criterion determined by the user.

14. The method of claim 1, further comprising:
receiving a plurality of preference criteria from the user; and
automatically notifying the user when a listing matches the plurality of preference criteria.

15. The method of claim 14, wherein automatically notifying the user when a listing matches the plurality of preference criteria includes automatically sending an e-mail to the user.

16. A method of developing via a web-based network a ratified contract for a real estate transaction for a particular real estate property and managing a workflow for the ratified contract, the method comprising:
collecting, online and in electronic form from a plurality of files, transaction specific information for a real estate contract, the transaction specific information including a contract price for the real estate contract;
automatically generating, online in a computer, an electronic file corresponding to the real estate contract for the real estate transaction by automatically populating a real estate contract form displayed via a computer with at least some of the transaction specific information from the plurality of files;
changing a portion of the transaction specific information in the real estate contract;

obtaining, online, approval of the real estate contract by a buyer and a seller in the workflow to provide a ratified contract,
  wherein only read access to the real estate contract is granted to at least some parties in the workflow,
  and wherein read/write access to the real estate contract is granted to the buyer and the seller.

17. The method of claim 16 wherein the collecting, online and in electronic form from a plurality of files, transaction specific information for a real estate contract further comprises obtaining information from a buyer information file, a seller information file, and a realty information file.

18. The method of claim 16 wherein the generating online an electronic file corresponding to the real estate contract for the real estate transaction further comprises generating the electronic file corresponding to the real estate contract for the real estate transaction in a portable document format (pdf) file format.

19. The method of claim 16, further comprising:
  receiving a selection from a user of a language in which to present the real estate contract; and
  presenting the real estate contract to the user in the selected language.

20. The method of claim 16 wherein the obtaining, online, approval of the real estate contract by the buyer and the seller to provide a ratified contract further comprises sending to a party involved with the real estate transaction, via a web-based connection, information corresponding to the real estate contract for the real estate transaction.

21. The method of claim 20 wherein;
  the party involved with the real estate transaction is one of the buyer, the seller, a selling agent, a selling broker, a listing agent, and a listing broker; and
  the information corresponding to the real estate contract for the real estate transaction is one of a notice concerning the real estate contract and the electronic file corresponding to the real estate contract.

22. The method of claim 20 further comprising the party involved with the real estate transaction disapproving the real estate contract and modifying the real estate contract to provide a counter offer real estate contract that upon approval becomes the ratified contract, the modifying the real estate contract further comprising at least one of adding and changing at least one of contract data, contract items, and contract funding information.

23. The method of claim 20 further comprising receiving, via a web-based network connection, an indication that a party involved with the real estate transaction has checked the status of the real estate contract, or offered comments regarding the real estate contract.

24. The method of claim 16, wherein obtaining approval of the real estate contract by the buyer and the seller to provide a ratified contract includes receiving an electronic signature from at least one of the buyer and the seller, the electronic signature verifying approval of the least one of the buyer and the seller to the real estate contract.

25. An electronic contract generator for generating a contract for a paperless real estate transaction for a particular real estate property and managing a workflow for the contract, the electronic contract generator comprising:
  a processor coupled to a database and a plurality of client processors via a web based network in a client server arrangement; and
  software instructions that when installed and executing on the processor results in the processor:
    collecting, online and in electronic form from a plurality of files, transaction specific information for a real estate contract, the transaction specific information including a contract price for the real estate contract;
    automatically generating, online in a computer, an electronic file corresponding to the real estate contract for the real estate transaction by automatically populating a real estate contract form displayed via a computer with at least some of the transaction specific information from the plurality of files;
    changing a portion of the transaction specific information in the real estate contract;
    obtaining, online, approval of the real estate contract by a buyer and a seller in the workflow to provide a ratified contract,
    wherein only read access to the real estate contract is granted to at least some parties in the workflow,
    and wherein read/write access to the real estate contract is granted to the buyer and the seller.

26. The electronic contract generator of claim 25 wherein the collecting, online and in electronic form from a plurality of files, transaction specific information for a real estate contract further comprises obtaining information from a buyer information file, a seller information file, and a realty information file.

27. The electronic contract generator of claim 25 wherein the generating online an electronic file corresponding to the real estate contract for the paperless real estate transaction further comprises generating the electronic file corresponding to the real estate contract for the real estate transaction in a portable document format (pdf) file format.

28. The electronic contract generator of claim 25 wherein the obtaining, online, approval of the real estate contract by the buyer and the seller to provide a ratified contract further comprises sending to a party comprising one of the buyer, the seller, a selling agent, a selling broker, a listing agent, and a listing broker involved with the real estate transaction, via a web-based network connection, one of a notice concerning the real estate contract and the electronic file corresponding to the real estate contract for the real estate transaction.

29. The electronic contract generator of claim 27 wherein the software instructions, when installed and executing on the processor, further result in the processor receiving instructions from the party involved with the real estate transaction disapproving the real estate contract and modifying the real estate contract to provide a counter offer real estate contract that upon approval is the ratified contract, wherein modifying the real estate contract further comprises one of adding and changing one of contract data, contract items, and contract funding information, wherein all modifying is tracked via a transaction history.

30. The electronic contract generator of claim 25 further comprising a centrally located server adapted to store the electronic file corresponding to the real estate contract for the real estate transaction and adapted to make available the electronic file in a current version to a multitude of service providers.

31. The electronic contract generator of claim 25 wherein the software instructions, when installed and executing on the processor, further result in the processor:
  receiving a selection from a user of a language in which to present the real estate contract; and
  presenting the real estate contract to the user in the selected language.

* * * * *